US010429512B2

(12) United States Patent
Torimoto et al.

(10) Patent No.: US 10,429,512 B2
(45) Date of Patent: Oct. 1, 2019

(54) NAVIGATION SIGNAL TRANSMITTING APPARATUS, NAVIGATION SIGNAL TRANSMISSION METHOD AND POSITIONAL INFORMATION PROVIDING APPARATUS

(75) Inventors: Hideyuki Torimoto, Tokyo (JP); Kazuki Okano, Tokyo (JP)

(73) Assignee: GNSS Technologies Inc., Tokyo (JP)

( * ) Notice: Subject to any disclaimer, the term of this patent is extended or adjusted under 35 U.S.C. 154(b) by 1216 days.

(21) Appl. No.: 13/697,537

(22) PCT Filed: May 11, 2011

(86) PCT No.: PCT/JP2011/060876
§ 371 (c)(1),
(2), (4) Date: Jan. 10, 2013

(87) PCT Pub. No.: WO2011/142394
PCT Pub. Date: Nov. 17, 2011

(65) Prior Publication Data
US 2013/0127660 A1 May 23, 2013

(30) Foreign Application Priority Data
May 13, 2010 (JP) .................................. 2010-111337

(51) Int. Cl.
*G01S 19/11* (2010.01)
*G01S 19/48* (2010.01)
*G01S 19/46* (2010.01)

(52) U.S. Cl.
CPC ............... *G01S 19/11* (2013.01); *G01S 19/46* (2013.01); *G01S 19/48* (2013.01)

(58) Field of Classification Search
CPC .......... G01S 19/11; G01S 19/46; G01S 19/48; G01S 19/05
See application file for complete search history.

(56) References Cited

U.S. PATENT DOCUMENTS 5,781,152 A    7/1998   Renard et al.
5,886,665 A *  3/1999   Dosh ...................... G01S 19/11
                                                     342/357.42
(Continued)

FOREIGN PATENT DOCUMENTS

CN    1302488 A    7/2001
CN    1394404 A    1/2003
(Continued)

OTHER PUBLICATIONS

Control unit. (1992). Academic press Dictionary of Science and Technology. Oxford, United Kingdom: Elsevier Science & Technology. Retrieved from http://search.credoreference.com/content/entry/apdst/control_unit/0.*

(Continued)

*Primary Examiner* — Bernarr E Gregory
*Assistant Examiner* — Fred H Mull
(74) *Attorney, Agent, or Firm* — Osha Liang LLP

(57) ABSTRACT

A navigation signal transmitting apparatus, provided on ground, for transmitting a navigation signal to a receiver capable of positioning by receiving a spread spectrum satellite positioning signal from a satellite has first and second transmission antennas; a message generating unit that generates a message signal of positional information included in the navigation signal, and a modulating unit that modulates the message signal by a modulation process including spectrum spreading, based on spread codes of the same sequence as the satellite positioning signal allotted in advance to the navigation signal transmitting apparatus, for generating first and second navigation signals. The modulating unit executes the modulating process using either one of the first and second navigation signals as an object of demodulation at each time of reception by the receiver.

8 Claims, 21 Drawing Sheets

(56) References Cited

U.S. PATENT DOCUMENTS

| | | |
|---|---|---|
| 2003/0031121 A1 | 2/2003 | Sudo |
| 2003/0137455 A1 | 7/2003 | McReynolds |
| 2003/0148761 A1* | 8/2003 | Gaal ............... G01S 19/05 455/423 |
| 2005/0242993 A1* | 11/2005 | Hein ............... H01Q 3/22 342/375 |
| 2006/0232467 A1* | 10/2006 | Small ............... G01S 5/021 342/357.63 |
| 2008/0281511 A1 | 11/2008 | Miyata |
| 2009/0115661 A1 | 5/2009 | Torimoto et al. |
| 2009/0243928 A1 | 10/2009 | Seino et al. |
| 2010/0176989 A1* | 7/2010 | Kim ............... G01S 19/02 342/357.48 |
| 2011/0050493 A1 | 3/2011 | Torimoto et al. |
| 2012/0194383 A1* | 8/2012 | Kawaguchi ......... G01S 5/0263 342/357.48 |

FOREIGN PATENT DOCUMENTS

| | | |
|---|---|---|
| CN | 101303236 A | 11/2008 |
| CN | 101438185 A | 5/2009 |
| CN | 201273938 Y | 7/2009 |
| JP | 5-227066 A | 9/1993 |
| JP | 2000-180527 A | 6/2000 |
| JP | 2001-525630 A | 12/2001 |
| JP | 2006-67086 A | 3/2006 |
| JP | 2006-278756 A | 10/2006 |
| JP | 2006-522920 A | 10/2006 |
| JP | 2007-278756 A | 10/2007 |
| JP | 2009-133731 A | 6/2009 |
| JP | 2011-069748 A | 4/2011 |
| RU | 2112991 C1 | 6/1998 |
| RU | 2178953 C2 | 1/2002 |
| TW | 200941026 A | 10/2009 |
| WO | 99/29050 A1 | 6/1999 |
| WO | 2004/008171 A1 | 1/2004 |
| WO | 2004/088349 A1 | 10/2004 |
| WO | 2007/119645 A1 | 10/2007 |
| WO | 2009/069700 A1 | 6/2009 |
| WO | 2011/036934 A1 | 3/2011 |

OTHER PUBLICATIONS

Decoder. (1992). Academic Press Dictionary of Science and Technology (4th ed.). Oxford, UK: Elsevier Science & Technology. Retrieved from http://search.credoreference.com/content/entry/apdst/decoder/0.*

Delay. (2011). American Heritage Dictionarie of the English Language (5th ed.). Boston, MA: Houghton Mifflin. Retrieved from http://search.credoreference.com/content/entry/hmdictenglang/delay/0.*

Synchronization loop, Credo Reference, http://search.credoreference.com/search/all?searchPhrase=%22synchronization=loop%22, accessed May 30, 2017.*

Dictionary defintion for intermittent, The American Heritage Dictionary of the English Language (6th ed.). Boston, MA: Houghton Mifflin. Retrieved from https://search.credoreference.com/content/entry/hmdictenglang/intermittent/0 (Year: 2016).*

Shift register. (1992). Academic Press Dictionary of Science and Technology (4th ed.). Oxford, UK: Elsevier Science & Technology. Retrieved from https://search.credoreference.com/content/entry/apdst/shift_register/0 (Year: 1992).*

Definition for complement. (2001). Hargrave's Communications Dictionary, Wiley, Hoboken, NJ. Retrieved from https://search.credoreference.conn/content/entry/hargravecomms/complement/0 (Year: 2001).*

Extended European Search Report issued in European Application No. 11780651.3, dated Dec. 16, 2013 (7 pages).

Im Sung-Hyuck et al., "Indoor Navigation and Multipath Mitigation Using Code-Offset Based Pseudolite Transmitter Array," ITM 2010—Proceedings of the 2010 International Technical Meeting of the Institute of Navigation; Manassas, VA; Jan. 27, 2010 (5 pages).

Office Action issued in corresponding Chinese Application No. 201180034637.7, dated Dec. 30, 2013 (13 pages).

Japanese Office Action for Application No. 2010-111337, dated Feb. 25, 2014 (9 pages).

Espacenet Abstract of JP2011069748 dated Apr. 7, 2011 (1 page).

Espacenet Abstract of JP2006278756 dated Oct. 12, 2006 (1 page).

Decision on Grant issed in Russian Application No. 2012153783/07(085449), dated Apr. 20, 2015 (19 pages).

International Search Report issued in PCT/JP2011/060876 dated Jun. 28, 2011 (4 pages).

Espacenet Abstract of JP2009133731A dated Jun. 18, 2009 (1 page).

Espacenet Abstract of JP2007278756A dated Oct. 25, 2007 (1 page).

Espacenet Abstract of JP5227066A dated Sep. 3, 1993 (1 page).

Espacenet Abstract of JP2001525630A dated Dec. 11, 2001 (1 page).

Espacenet Abstract of JP2006522920A dated Oct. 5, 2006 (1 page).

Espacenet Abstract of JP2006067086A dated Mar. 9, 2006 (1 page).

Espacenet Abstract of JP2000180527A dated Jun. 30, 2000 (1 page).

Office Action issued in corresponding Taiwanese Application No. 100116903, dated Sep. 23, 2013 (16).

Espacenet Abstract for Chinese Publication No. 1394404 dated Jan. 29, 2003 (1 page).

Espacenet Abstract for Taiwanese Publication No. 200941026 dated Oct. 1, 2009 (1 page).

Espacenet Abstract for Chinese Publication No. 1302488 dated Jul. 4, 2001 (1 page).

* cited by examiner

| | COMPATIBILITY OF RECEPTION SYSTEM | ADAPTABILITY TO STATE TRANSITION |
|---|---|---|
| 1 CHIP UNIT (1 μs) | ◯⁻ POSSIBLY REQUIRE CHANGE OF CODE TRACKING LOOP, THOUGH RARE | ◎⁺ HIGH ADAPTABILITY HIGHLY EFFECTIVE |
| 2 CHIP UNIT (2 μs) | ◯⁺ POSSIBLY REQUIRE CHANGE OF CODE TRACKING LOOP, THOUGH RARE | ◎⁻ HIGH ADAPTABILITY HIGHLY EFFECTIVE |
| CODE UNIT (1ms) | ◎⁺ REQUIRES NO CHANGE | ◯ DEPENDS ON STATE OF HIGH SPEED MOVEMENT EFFECTIVE AT LOW SPEED (FOR PEDESTRIAN) |

NAVIGATION SIGNAL TRANSMITTING APPARATUS, NAVIGATION SIGNAL TRANSMISSION METHOD AND POSITIONAL INFORMATION PROVIDING APPARATUS

BACKGROUND

Technical Field

The present invention relates to a technique for providing positional information and, to a navigation signal transmitting apparatus and a navigation signal transmission method, for transmitting navigation signals. More specifically, the present invention relates to a technique for providing positional information even in an environment out of reach of a signal transmitted from a satellite emitting a positioning signal.

Background Art

GPS (Global Positioning System) has been known as a conventional positioning system. A satellite (hereinafter referred to as a "GPS satellite") transmitting a signal used for GPS (hereinafter referred to as a "GPS signal") flies at an altitude of about 20,000 km from the ground. By receiving and demodulating a signal emitted from the GPS satellite, a user can measure the distance between the GPS satellite and the user. Therefore, if there is no obstacle between the ground and the GPS satellite, positioning is possible using the signal emitted from the GPS satellite. Assume, however, use of the GPS in an urban area. It may often be the case that the signal emitted from the GPS satellite cannot be received by a positional information providing apparatus of the user, hindered by high buildings standing in large numbers. Further, diffraction or reflection of the signal by a building may cause an error in the distance measurement using the signal and, as a result, positioning accuracy is often degraded.

Though a technique has been known to receive in a room a weak GPS signal that has passed through a wall or roof, state of reception is unstable and positioning accuracy is low.

In the foregoing, positioning using GPS has been described by way of example. The phenomenon described above, however, is common to positioning systems using satellites in general. The satellite positioning system is not limited to GPS, and it may include systems such as GLONASS (GLObal Navigation Satellite System) of Russian Federation and Galileo of Europe.

Technique related to provision of positional information is disclosed, for example, in Japanese Patent Laying-Open No. 2006-67086 (Patent Literature 1).

According to the technique disclosed in Japanese Patent Laying-Open No. 2006-67086, however, the reader or writer is unique to the system for providing positional information and lacks versatility. In order to prevent interference, it is necessary to restrain transmission output and, therefore, the area in which positional information is receivable is limited and it is difficult to obtain positional information continuously. Further, a large number of transmitters are required to cover a wide area.

Further, in connection with acquisition or notification of positional information, it is possible to locate a source of a signal transmission if a telephone call is made from a fixed telephone, as the location of the fixed telephone is known in advance. Wide-spread use of portable telephones, however, makes mobile communication more and more common and it becomes increasingly difficult to notify the positional information of the caller, unlike in the case of a fixed telephone. On the other hand, concerning emergency call, legislation has been considered to include positional information in a call from a portable telephone.

A conventional portable telephone having a positioning function obtains positional information where a signal from a satellite is receivable and, therefore, it is possible to notify the position of the portable telephone. Where it is impossible to receive radio wave, such as in an underground mall or indoors, however, positional information cannot be obtained by the conventional positioning technique.

In view of the foregoing, a technique may be considered in which a plurality of transmitters capable of emitting signals similar to the GPS signal are arranged indoors to find the position based on the principle of trilateration similar to GPS (for example, see Japanese Patent Laying-Open No. 2000-180527 (Patent Literature 2)). Such an approach, however, requires that the transmitters are synchronized in time, increasing the cost of transmitters.

The invention disclosed in Patent Literature 2 relates to a technique of reducing influence of multipath and the like, utilizing the fact that objects that blocks or reflects radio waves are arranged at prescribed positions with respect to direction of movement of a receiving terminal for positioning.

Further, Japanese Patent Laying-Open No. 2007-278756 (Patent Literature 3) discloses a technique of simplifying system configuration for indoor positioning and improving accuracy of positioning, by controlling transmission power indoors and by transmitting positional information in a format compatible with GPS signal indoors, rather than the trilateration mentioned above.

CITATION LIST

Patent Literature

PTL 1: Japanese Patent Laying-Open No. 2006-67086
PTL 2: Japanese Patent Laying-Open No. 2000-180527
PTL 3: Japanese Patent Laying-Open No. 2007-278756

SUMMARY OF INVENTION

Generally, however, a receiving terminal for positioning moves in arbitrary directions indoors and indoor reflection and the like makes radio wave propagation complicated. Therefore, even when an expensive transmitter such as described in Patent Literature 2 is installed, errors of about 10 m apt to occur.

Further, according to the technique of Patent Literature 3, though positioning accuracy can be maintained while significantly simplifying the configuration of indoor transmitter, stability of signal reception may possibly degrade in an environment much influenced by multipath.

Specifically, in a multipath environment, signal acquisition speed lowers, or it becomes difficult to maintain once acquired signals in a locked state, because of null-point influence.

One or more embodiments of the present invention provides a positional information providing system providing positional information by increasing signal reception stability, even in an environment with significant multipath fading at a place out of reach of a radio wave from a satellite emitting a positioning signal.

One or more embodiments of the present invention provides a navigation signal transmitting apparatus, provided on the ground, for transmitting a navigation signal to a receiver capable of positioning by receiving a spread spectrum satellite positioning signal from a satellite. The navigation signal transmitting apparatus includes: first and second transmission antennas; a message generating unit generating a message signal of positional information included in the navigation signal; and a modulating unit modulating the message signal by a modulation process including spectrum spreading, based on spread codes of the same sequence as the satellite positioning signal allotted in advance to the navigation signal transmitting apparatus, for generating first and second navigation signals. The modulating unit executes the modulating process using either one of the first and second navigation signals as an object of demodulation at each time of reception by the receiver. The navigation signal transmitting apparatus further includes a transmitting unit transmitting the first and second navigation signals from the first and second transmission antennas, respectively.

According to one or more embodiments of the present invention, the modulating unit includes: a first code generating unit for generating a first code of the spread codes of the same sequence; a first spreading unit for performing spectrum spreading on the message signal with the first code, to generate the first navigation signal; a second code generating unit for generating a second code of the spread codes of the same sequence, different from the first code; and a second spreading unit for performing spectrum spreading on the message signal with the second code, to generate the second navigation signal.

The modulating unit includes: a spread code generating unit for generating a specific code of the spread codes of the same sequence; a first spreading unit for performing spectrum spreading on the message signal with the specific code, to generate the first navigation signal; a delay unit for delaying the message signal by a prescribed time period; and a second spreading unit for performing spectrum spreading on an output from the delay unit with the specific code, to generate the second navigation signal.

According to one or more embodiments of the present invention, the modulating unit includes a spread code generating unit for generating a specific code of the spread codes of the same sequence, and a spreading unit for performing spectrum spreading on the message signal with the specific code. The transmitting unit transmits outputs of the spreading unit as the first and second navigation signals, successively and exclusively from either one of the first and second transmission antennas.

According to one or more embodiments of the present invention, the positional information includes data representing at least latitude, longitude and altitude.

One or more embodiments of the present invention provides a method of transmitting a navigation signal of a transmitter provided on the ground, for transmitting a navigation signal to a receiver capable of positioning by receiving a spread spectrum satellite positioning signal from a satellite. The navigation signal transmitting method includes the steps of: generating a message signal of positional information included in the navigation signal; and modulating the message signal by a modulation process including spectrum spreading, based on spread codes of the same sequence as the satellite positioning signal allotted in advance to the transmitter, for generating first and second navigation signals. In the modulation process, either one of the first and second navigation signals is used as an object of demodulation at each time of reception by the receiver. The method further includes the step of transmitting the first and second navigation signals from first and second transmission antennas, respectively.

According to one or more embodiments of the present invention, the step of generating the first and second navigation signals includes: generating a first code of the spread codes of the same sequence; performing spectrum spreading on the message signal with the first code, to generate the first navigation signal; generating a second code of the spread codes of the same sequence, different from the first code; and performing spectrum spreading on the message signal with the second code, to generate the second navigation signal.

According to one or more embodiments of the present invention, the step of generating the first and second navigation signals includes: generating a specific code of the spread codes of the same sequence; performing spectrum spreading on the message signal with the specific code, to generate the first navigation signal; delaying the message signal by a prescribed time period; and performing spectrum spreading on the delayed message signal with the specific code, to generate the second navigation signal.

According to one or more embodiments of the present invention, the step of generating the first and second navigation signals includes: generating a specific code of the spread codes of the same sequence; generating a sequence of pseudo random numbers, those skilled in the art will readily appreciate that a sequence generator may be used to generate a sequence of pseudo random numbers; performing spectrum spreading on the message signal with the specific code, to generate the first navigation signal; and performing spectrum spreading on the message signal with the specific code, to generate the second navigation signal. The step of transmitting includes the step of transmitting the first and second navigation signals successively and exclusively from either one of the first and second transmission antennas, based on the pseudo random numbers.

According to one or more embodiments of the present invention, the positional information includes data representing at least latitude, longitude and altitude.

One or more embodiments of the present invention provides a positional information providing apparatus capable of positioning by receiving a spread spectrum satellite positioning signal from a satellite, providing positional information using a plurality of positioning signals as spread spectrum signals from a navigation signal transmitting apparatus provided on the ground, transmitted using diversity transmission. The positional information providing apparatus includes: a receiving unit for receiving the spread spectrum signals; a storage unit storing patterns of a plurality of spread codes of the same sequence as the satellite positioning signal, for the positioning signal; demodulating units provided in parallel with each other, for performing correlation processes commonly and in parallel on the patterns of a plurality of spread codes, for identifying and demodulating the plurality of positioning signals transmitted using diversity transmission; and a determining unit for calculating, if the plurality of positioning signals are identified and demodulated, the positional information from any of the identified plurality of positioning signals.

According to one or more embodiments of the present invention, the demodulating unit includes a first correlator unit for executing a correlation process with a first code of the spread codes of the same sequence, a second correlator unit for executing a correlation process with a second code, different from the first code, of the spread codes of the same sequence, and a control unit realizing control such that using synchronization timing of that one of the first and second correlator units which established synchronization loop earlier, synchronizing process for the other one is executed.

According to one or more embodiments of the present invention, the demodulating unit includes a delay unit for delaying the received spread spectrum signal by a designated time period, a first correlator unit for executing a correlation process with a first code of the spread codes of the same sequence, a second correlator unit for executing a correlation process with a second code of the spread codes of the same sequence, and a control unit realizing control such that using a spread code of that one of the first and second correlator units which established synchronization loop earlier, synchronizing process for the other one is executed on a signal delayed by a prescribed time period by the delay unit.

According to one or more embodiments of the present invention, the positional information includes data representing at least latitude, longitude and altitude.

One or more embodiments of the present invention provides positional information without degrading accuracy, even in an environment with significant influence of multipath fading at a place out of reach of a radio wave from a satellite emitting a positioning signal.

BRIEF DESCRIPTION OF DRAWINGS

FIG. 6 is a functional block diagram illustrating a configuration of a modulator 245a.

FIG. 17 is a block diagram showing hardware configuration of an indoor transmitter 200-1" in accordance with Embodiment 3.

FIG. 21 is a table indicating periods of exclusively and intermittently switching transmission signal outputs, and corresponding advantages and disadvantages.

DETAILED DESCRIPTION

Figure 1:
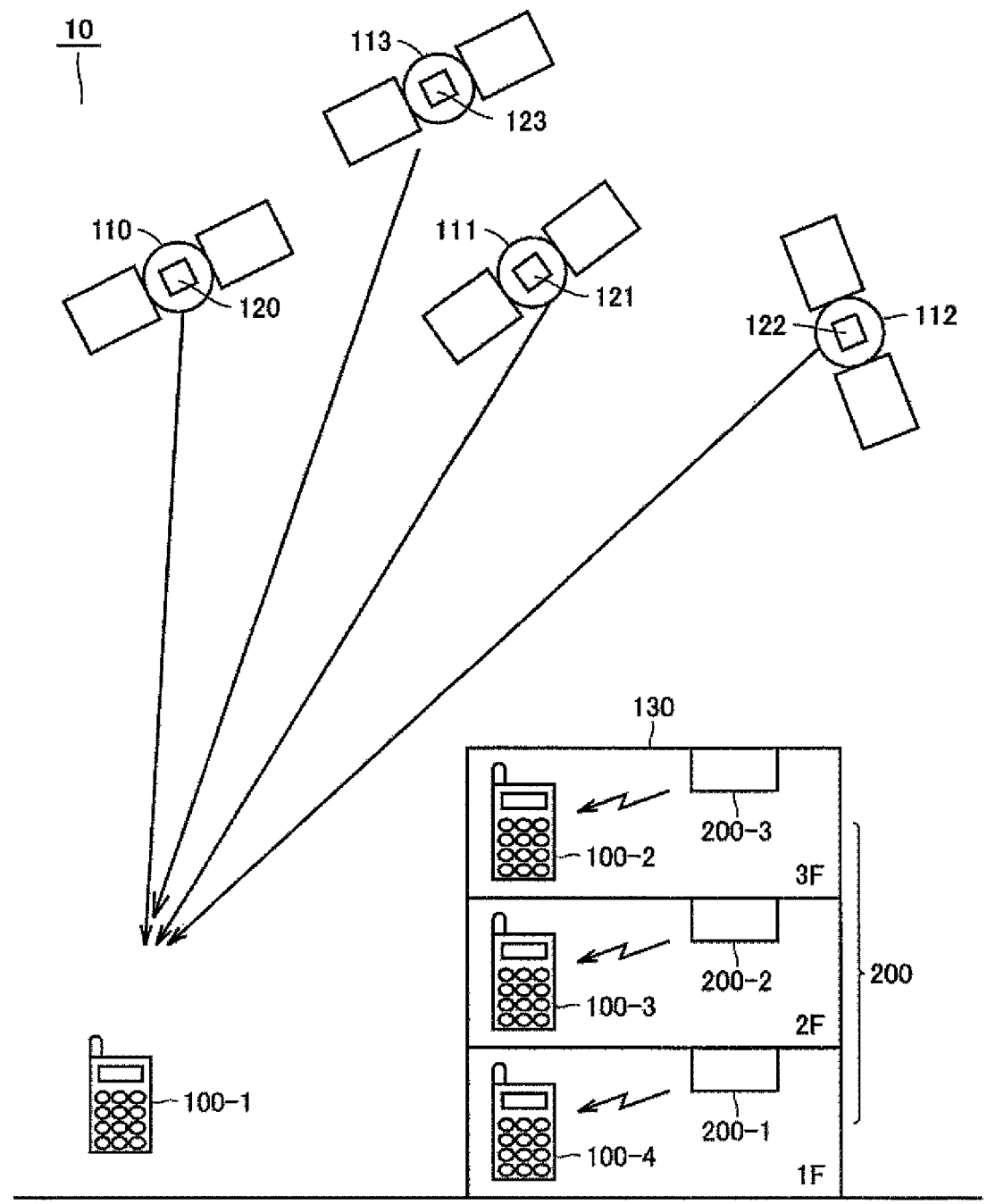
FIG. 1 shows a configuration of a positional information providing system 10.

In the following, embodiments of the present invention will be described with reference to the figures. In the following description, the same components are denoted by the same reference characters. Their names and functions are also the same. Therefore, detailed description thereof will not be repeated. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Embodiment 1

FIG. 1 shows a configuration of positional information providing system 10. Referring to FIG. 1, a positional information providing system 10 in accordance with the first embodiment of the present invention will be described. Positional information providing system 10 includes GPS (Global Positioning System) satellites 110, 111, 112 and 113 flying at an altitude of 20,000 meters above the ground, emitting signals for positioning (hereinafter referred to as positioning signals), and positional information providing apparatuses 100-1 to 100-4 functioning as apparatuses for providing positional information. Specifically, the positional information providing apparatus operates as a navigation signal receiving apparatus receiving a positioning signal and providing the user with positional information. Positional information providing apparatuses 100-1 to 100-4 will be generally referred to as a positional information providing apparatus 100. Positional information providing apparatus 100 is, for example, a terminal having a conventional positioning device, such as a portable telephone, a car navigation system or other mobile positioning device. Specifically, positional information providing apparatus 100 receives a positioning signal, and based on information included in the received positioning signal, calculates current position of positional information providing apparatus 100.

Here, the positioning signal is a so-called spread spectrum signal and, by way of example, it is a so-called GPS signal. The signal, however, is not limited to the GPS signal. In the following, for simplicity of description, the positioning system will be described using GPS as an example. One or more embodiments of the present invention is also applicable to other satellite positioning systems (such as Galileo and GLONASS).

Central frequency of the positioning signal is, by way of example, 1547.42 MHz. Spreading frequency of the positioning signal is, by way of example, 1.023 MHz. Here, the frequency of positioning signal becomes the same as the C/A (Coarse and Access) signal in a L1 band of existing GPS. This means that front end of an existing positioning signal receiving circuit (such as a GPS signal receiving circuit) can be used and, therefore, positional information providing apparatus 100 can receive the positioning signal simply by changing software for processing signals from the front end, without adding any new hardware circuitry.

The positioning signal may be modulated with a rectangular wave of 1.023 MHz. In that case, if the data channel of the modulated signal is the same as that of the positioning signal planned for new transmission in the L1 band, the user can receive the positioning signal using a receiver that can receive and process the new GPS signal. The frequency of rectangular wave may be different from 1.023 MHz. If modulation is to be done with other frequency, the frequency for modulation is determined based on a trade-off with spectrum separation for avoiding interference of the demodulated signal with existing C/A signal and/or other signal.

GPS satellite 110 has a transmitter 120 mounted thereon, for emitting the positioning signal. GPS satellites 111, 112 and 113 have similar transmitters 121, 122 and 123 mounted, respectively.

Positional information providing apparatuses 100-2, 100-3 and 100-4 having similar functions as positional information providing apparatus 100-1 are usable at places where radio wave reception is difficult, such as in a building 130, as will be described in the following. On the ceiling of the first floor of building 130, an indoor transmitter 200-1 is attached. Specifically, the indoor transmitter operates as a navigation signal transmitting device for transmitting a positioning signal including positional information to the receiving side. Positional information providing apparatus 100-4 receives the positioning signal emitted from indoor transmitter 200-1. Similarly, indoor transmitters 200-2 and 200-3 are respectively attached to ceilings of the second and third floors of building 130. Here, time of each of the indoor transmitters 200-1, 200-2 and 200-3 (hereinafter referred to as the "ground time") may be independent from the time of GPS satellites 110, 111, 112 and 113 (hereinafter referred to as the "satellite time"), and need not be in synchronization. It is noted, however, that the satellite time must be synchronized with each other. Therefore, the satellite time is controlled by an atomic clock mounted on each satellite. According to one or more embodiments of the present invention, indoor transmitters 200-1, 200-2 and 200-3 are in synchronization with each other in time, that is, in ground time, as needed.

The spread spectrum signal emitted as a positioning signal from each transmitter of GPS satellites is generated by modulating a navigation message with a PRN (Pseudo Random Noise) code. The navigation message includes time data, orbit information, almanac, and ionosphere correction data. Each of the transmitters 120 to 123 further holds data (PRN-ID (Identification)) for identifying each of the transmitters 120 to 123 itself or for identifying the GPS satellites on which the transmitters 120 to 123 are mounted.

Positional information providing apparatus 100 has data for generating each pseudo random noise code and a code generator. Receiving the positioning signal, positional information providing apparatus 100 executes a demodulation process, which will be described later, using a code pattern of pseudo random noise code allocated to the transmitter of each satellite or to each indoor transmitter, whereby it can identify from which satellite or from which indoor transmitter the received signal is emitted. Further, a new GPS signal includes PRN-ID in the data and, therefore, it is possible to prevent signal acquisition and tracking using an erroneous code pattern, which is likely when reception level is low.

(Transmitter Mounted on GPS Satellite)

The configuration of a transmitter mounted on a GPS satellite is well-known. Therefore, in the following, configuration of the transmitter mounted on a GPS satellite will be briefly described. Each of transmitters 120, 121, 122 and 123 includes an atomic clock, a storage storing data, an oscillation circuit, a processing circuit for generating the positioning signal, an encoding circuit for spread-spectrum coding of the signal generated by the processing circuit, and a transmission antenna. The storage stores navigation message having ephemeris, almanac of each satellite, ionosphere correction data and the like, and PRN-ID.

The processing circuit generates a message for transmission, using time information from the atomic clock and various data stored in the storage.

It is noted that a code pattern for the pseudo random noise code for spread-spectrum coding is defined beforehand for each of the transmitters 120 to 123. Each code pattern differs transmitter by transmitter (that is, GPS satellite by satellite). The encoding circuit effects spectrum-spreading of the message, using the pseudo random noise code as such. Each of the transmitters 120 to 123 converts the thus encoded signal to high frequency, and emits the resulting signal to the space through the transmission antenna.

As described above, transmitters 120 to 123 emit spread spectrum signals not causing harmful interference with other transmitters. Here, not causing "harmful interference" may be ensured by the output level so restrained as to prevent any interference. Alternatively, it can be realized by a manner of spreading spectrum. The signal is transmitted using, for example, a carrier wave referred to as L1 band. Each of the transmitters 120 to 123 emits positioning signals having the same frequency, for example, in accordance with spread spectrum communication method. Therefore, when positioning signals transmitted from respective satellites are received by positional information providing apparatus 100-1, respective positioning signals can be received without cross-talk.

As to the positioning signals from indoor transmitters on the ground, similar to the signals transmitted from satellites, positioning signals from the plurality of indoor transmitters can be received without cross-talk.

[Configuration of Indoor Transmitter 200]

Figure 2:
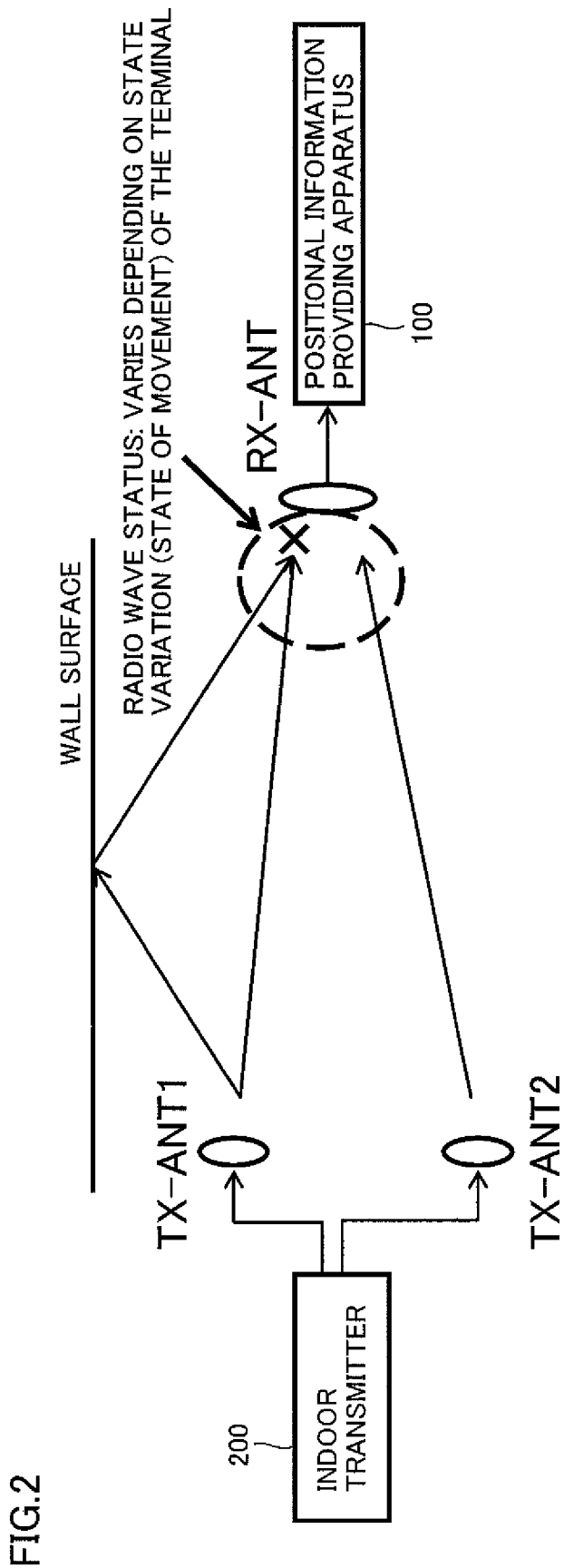
FIG. 2 is a schematic illustration showing a state of reception of positional information providing apparatus 100 receiving a positional signal from an indoor transmitter 200 in accordance with Embodiment 1.

FIG. 2 is a schematic illustration showing a state of reception of positional information providing apparatus 100 (positional information providing apparatuses 100-1 to 100-4 will be generally referred to as a positional information providing apparatus 100) receiving a positional signal from an indoor transmitter 200 (indoor transmitters 200-1 to 200-3 will be generally referred to as indoor transmitter 200) in accordance with Embodiment 1.

Indoor transmitter 200 is installed at a fixed position such as a ceiling or wall of a building. On the other hand, positional information providing apparatus 100 as a user terminal is supposed to move indoors.

Generally, communication of a communication system becomes unstable because of fading phenomenon, particularly when radio waves are reflected by structures on indoor walls. Therefore, the following configuration is adopted for indoor transmitter 200 to alleviate, as one effect, the system instability resulting from multipath.

Indoor transmitter 200 has two transmission antennas TX-ANT1 and TX-ANT2 and, of the so-called space diversity, transmission diversity is utilized. Transmission antennas TX-ANT1 and TX-ANT2 are arranged at physically distant positions. According to one or more embodiments of the present invention, distance between the two antennas is about some dozen centimeters to about 1 m.

As will be described in the following, signals from transmission antennas TX-ANT1 and TX-ANT2 transmit data of the same contents, while the signals have configurations that can be distinguished from each other by positional information providing apparatus 100. In indoor transmitter 200, a so-called Code Division Multiple Access is adopted and, therefore, signals transmitted from respective antennas have the same frequency.

It is noted, however, that in indoor transmitter 200 in accordance with Embodiment 1, different codes may be used for signals transmitted from transmission antennas TX-ANT1 and TX-ANT2, so that a signal from one of the antennas can be selected by positional information providing apparatus 100.

In indoor transmitter 200, generally, it is possible to use not only transmission diversity but also reception diversity as the diversity system. Indoor transmitter 200 of Embodiment 1, however, does not adopt the reception diversity. The reason for this is that the reception diversity system requires provision of a plurality of antennas on the side of receiving terminal and, therefore, transmission diversity is more advantageous from the viewpoint of cost, operability and portability.

The number of antennas used for transmission diversity is not limited to two, and more generally, a plurality of antennas, that is, two or more antennas (3, 4, . . . ) may be used.

In the transmission diversity method adopted by indoor transmitter 200 of Embodiment 1, a plurality of antennas are provided on the transmitting side and only one antenna is provided on the receiving side. In order to distinguish a plurality of transmission signals, indoor transmitter 200 utilizes cross-correlation property of pseudo random noise (PRN) as spread code for spread spectrum (hereinafter referred to as "PRN code"), to realize high signal selectivity.

Figure 3:
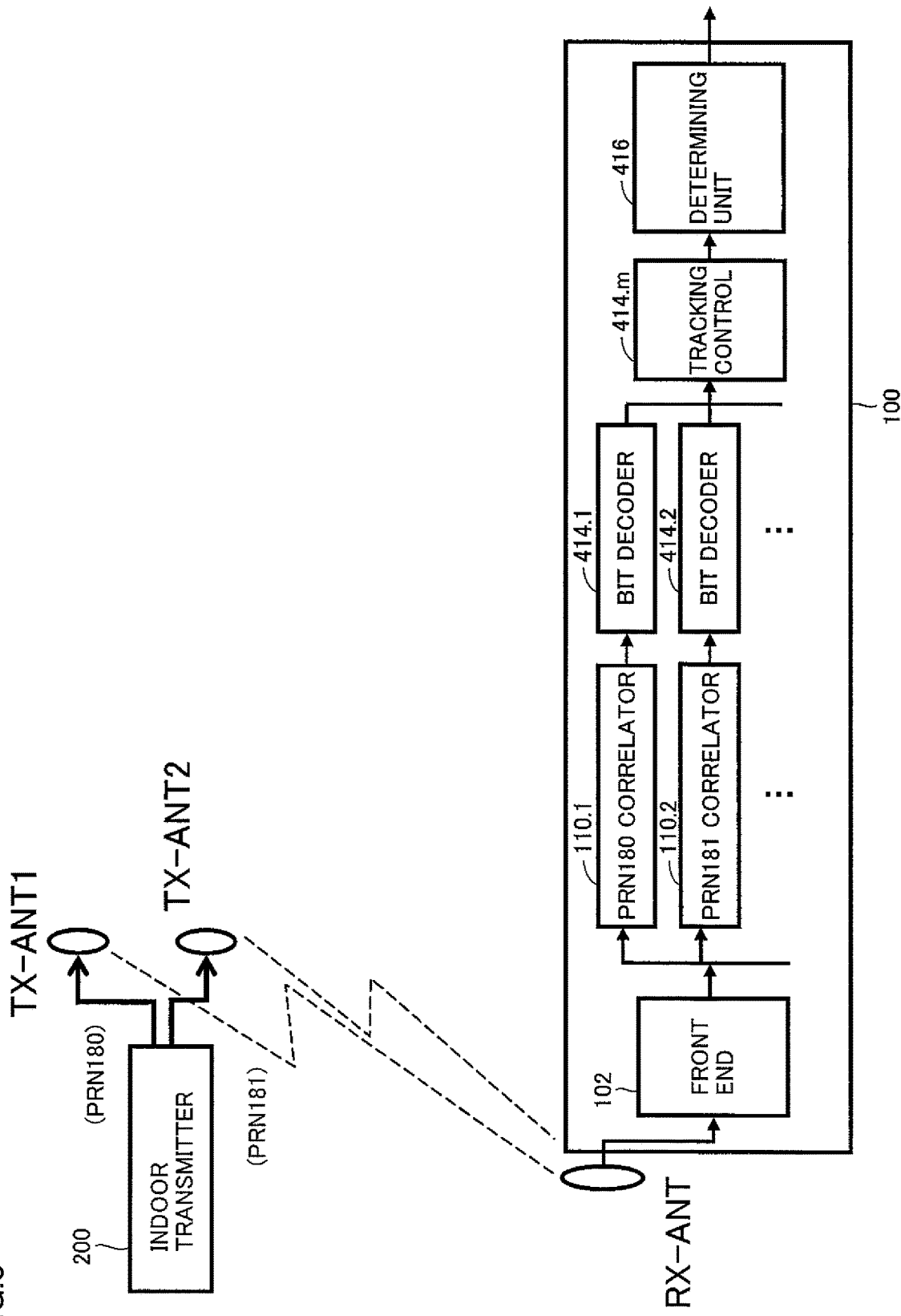
FIG. 3 is an illustration showing schematic configuration and operation of positional information providing apparatus 100 in accordance with Embodiment 1.

FIG. 3 is an illustration showing schematic configuration and operation of positional information providing apparatus 100 in accordance with Embodiment 1.

Referring to FIG. 3, positional information providing apparatus 100 receives, at a reception antenna RX-ANT, positioning signals that are spread spectrum signals coded with different codes (here, codes PRN 180 and 181) and transmitted through transmission antennas TX-ANT1 and TX-ANT2 from indoor transmitter 200. Which spread code is to be allocated to which spread code from indoor transmitter 200 is not limited to the example shown in FIG. 3. What is necessary in system design is that different codes are allocated so that a positioning signal from a satellite can be distinguished from a positioning signal from indoor transmitter 200.

The positioning signals received by reception antenna RX-ANT are converted to baseband signals by a front end 102. Here, front end 102 includes a filter for extracting high-frequency reception signals, an amplifier circuit for amplifying high-frequency signals, a down-converter and an A/D converter.

By correlators 110.1 to 110.$n$, correlation between the signal from front end 102 and a replica signal of spread code is detected. The PRN codes used as spread codes are stored in advance in positional information providing apparatus 100 as the receiving side. Therefore, positional information providing apparatus 100 performs the correlation process in parallel for the plurality of signals for positioning, that were generated using the PRN codes stored in indoor transmitter 200 and are transmitted from indoor transmitter 200. In the configuration shown in FIG. 3, only the correlator 110.1 corresponding to code PRN 180 and correlator 110.2 corresponding to code PRN 181 are shown as representatives. Actually, in order to realize seamless positioning when positional information providing apparatus 100 moves from the outside to the inside of a building, for example, correlators 110.1 to 110.$n$ are provided sufficient in number to realize parallel correlation process not only for the spread codes allocated in advance to indoor transmitters 200 but also for the spread codes allocated in advance to GPS satellites orbiting the earth. Desirably, correlators 110.1 to 110.$n$ are provided in the same number as the sum of the number of spread codes allocated in advance to indoor transmitters 200 and the number of spread codes allocated in advance to GPS satellites orbiting the earth, and these correlators perform the correlation operations in parallel.

By way of example, one correlator 110.1 is provided with correlator units the same in number as the number of corresponding spread codes (PRN code) PRN 180 that can be sampled as time-delay (for a signal of m chips, the number corresponding to 2 m chips for every ½ chip), and correlation process is executed in parallel for each time-delay.

Specifically, positional information providing apparatus 100 searches each of the PRN codes of transmission signals independently and asynchronously. If one PRN code is first acquired, it tries to acquire another PRN code by another correlator (correlator unit), using synchronization loop thereof. If there is any synchronized diversity signal, very fast acquisition is possible.

Further, bit decoders 414.1 to 414.$n$ are provided corresponding to correlators 110.1 to 110.$n$.

If a PRN code is acquired, signals from correlators 110.1 to 110.$n$ are thereafter decoded by bit decoders 414.1 to 414.$n$ provided corresponding to correlators 110.1 to 110.$n$. Based on the acquired positioning signal, determining unit 416 determines whether or not positional information providing apparatus 100 is inside or outside of a building. Further, determining unit 416 also determines whether or not the received signal has been transmitted using the diversity method. Details of the subsequent process executed for positioning will be described later.

Therefore, it is possible for positional information providing apparatus 100 to determine 1) to which spread code the received positioning signal corresponds, and 2) whether the received signal is a positioning signal from a GPS satellite or a positioning signal from indoor transmitter 200, in a very short time period.

A track control unit 414.$m$ establishes and maintains a synchronization loop, based on signals from bit decoders 414.1 to 414.$n$.

Here, it is assumed that the positioning signals from indoor transmitter 200 are spread by codes PRN 180 and PRN 181 and, therefore, positioning signals from correlators 110.1 and 110.2 corresponding to these signals are acquired in a short time, and synchronization is established. When a first data packet is fully received and determined to be OK by a parity check, the data packet thus passed the parity check is compared with packet data of another channel (corresponding to the other correlator unit). If the data are the same, respective PRN numbers are allocated to diversity channels.

As a result, positional information providing apparatus 100 selects one of the signals of two channels in which synchronization is established, and thereby realizes positioning.

[Hardware Configuration of Indoor Transmitter 200-1]

Figure 4:
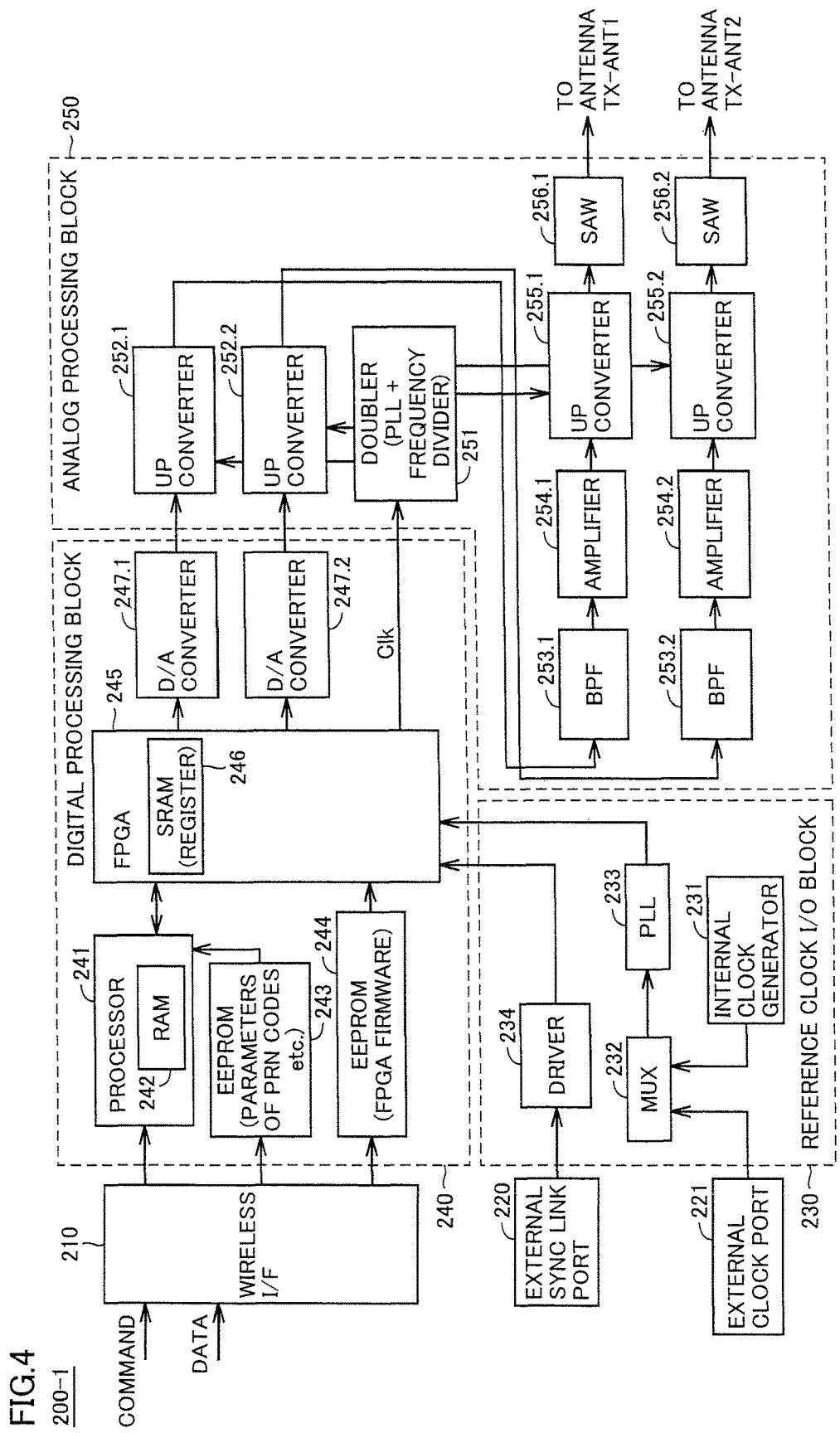
FIG. 4 is a block diagram showing hardware configuration of an indoor transmitter 200-1 in accordance with Embodiment 1.

FIG. 4 is a block diagram showing hardware configuration of an indoor transmitter 200-1 in accordance with Embodiment 1. In the following, referring to FIG. 4, indoor transmitter 200-1 will be described.

Indoor transmitter 200-1 includes: a wireless interface (hereinafter referred to as wireless I/F) 210; a digital processing block 240; a reference clock input/output block (hereinafter referred to as "reference clock I/O block") 230 electrically connected to digital processing block/digital processor 240 for supplying a reference clock for operations of various circuit portions; an analog processing block 250 electrically connected to digital processing block 240; transmission antennas TX-ANT1 and TX-ANT2 (not shown) electrically connected to analog processing block 250 for transmitting signals for positioning; and a power source (not shown) for supplying power supply potential to various portions of indoor transmitter 200-1.

The power source may be provided inside indoor transmitter 200-1, or external power supply may be received.

(Wireless Communication Interface)

Wireless I/F 210 is an interface for wireless communication, for receiving external commands, receiving setting parameters or program data (such as firmware) from the outside or for transmitting data to the outside as needed, by wireless communication using near field communication such as Bluetooth, PHS (Personal Handyphone System) or portable telephone network.

Since indoor transmitter 200-1 has wireless I/F 210 as such, even when it is mounted on a ceiling of a building, for example, it is possible to change positional data (data representing the place where indoor transmitter 200-1 is mounted) to be transmitted from indoor transmitter 200-1, or to support a different communication method by changing firmware.

Though wireless interface is assumed in the present embodiment, wired interface is also possible, if it is advantageous considering troubles of wiring and installation on an intended place of mounting.

(Digital Processing Block)

Digital processing block 240 includes: a processor 241 for controlling an operation of indoor transmitter 200-1 in response to a command from wireless I/F 210 or in accordance with a program; an RAM (Random Access Memory) 242 mounted on processor 241 for storing a program or programs executed by processor 241; an EEPROM (Electronically Erasable and Programmable Read-Only Memory) 243 for storing setting parameters and the like among data from wireless I/F 210; a field programmable gate array (hereinafter denoted as "FPGA") 245 for generating baseband signals to be transmitted from indoor transmitter 200-1 under the control of processor 241; an EEPROM 244 for storing firmware of FPGA 245 among the data from wireless I/F 210; and digital/analog converters (hereinafter referred to as D/A converters) 247.1 and 247.2, for changing the baseband signals output from FPGA 245 to analog signals and applying the signals to analog processing block 250.

Specifically, digital processing block 240 generates data as the source of signals transmitted by indoor transmitter 200-1 as the positioning signals. The source data has been subjected to spreading process using different spread codes for transmission antennas TX-ANT1 and TX-ANT2, as described above. Digital processing block 240 transmits the generated data as two bit streams, to analog processing block 250.

Though not specifically limited, the firmware program stored in EEPROM 244 is loaded to FPGA 245 when FPGA 245 is powered-on. The firmware program information (bit stream data) is loaded to a configuration memory implemented by an SRAM (Static Random Access Memory) in FPGA 245. Individual bit data of the loaded bit stream data will be the information source of a circuit realized on FPGA 245, and customizes resources provided in FPGA 245 to realize a circuit specified by the firmware program. Since FPGA 245 is independent from hardware and configuration data is provided from the outside, high versatility and flexibility can be realized.

Further, processor 241 stores the following as parameters set in indoor transmitter 200-1, in SRAM 246 (register) of FPGA 245, based on the data stored in EEPROM 243, in accordance with an external command received from wireless I/F 210:

1) Pseudo Spread Code (PRN code);
2) Transmitter ID;
3) Transmitter coordinates; and
4) Message (shaped to the same format as navigation message from satellite, in FPGA 245).

The program for the operation of processor 241 is also stored in advance in EEPROM 243, and when indoor transmitter 200-1 is activated, the program is read from EEPROM 243 and transferred to RAM 242.

The storage for storing the program or data is not limited to EEPROM 243 or 244. A storage at least capable of storing data in non-volatile manner, or a battery back-up RAM (Random Access Memory) that can retain stored data even when power is off may be used. As those skilled in the art will readily appreciate, FPGA 245 is a programmable logic circuit. If data is input from the outside, any storage that allows data writing may be used. Data structure of EEPROM 243 will be described later.

(Analog Processing Block)

Analog processing block 250 modulates carrier wave of 1.57542 GHz using two bit streams output from digital processing block 240 to generate a transmission signal, and outputs it to two transmission antennas TX-ANT1 and TX-ANT2, respectively. The signals are emitted as diversity signals from transmission antennas TX-ANT1 and TX-ANT2.

Specifically, the two signals output from D/A converter 247 of digital processing block 240 are up-converted by up-converters 252.1 and 252.2, passed through band-pass filters (BPF) 253.1 and 253.2 and amplifiers 254.1 and 254.2 to have only the signals of prescribed frequency band amplified, again up-converted by up-converters 255.1 and 255.2, and signals of a prescribed band are taken by SAW (Surface Acoustic Wave) filters 256.1 and 256.2. Then, the resulting signals are emitted from transmission antennas TX-ANT1 and TX-ANT2.

The clock used in up-converters 252.1 and 252.2 and up-converters 255.1 and 255.2 is the clock supplied from reference clock I/O block 230 to FPGA 245 and doubled by a doubler 251.

In this manner, a signal having the same configuration as that of the signal for positioning from a satellite is emitted, in diversity method, from indoor transmitter 200-1. Here, the contents of the signal are not perfectly the same as the contents of the positioning signal emitted from the satellite. An example of the configuration of signal emitted from indoor transmitter 200-1 will be described later.

Though FPGA 245 is used as an arithmetic processing unit for realizing the digital signal processing in digital processing unit 240 in the foregoing description, other arithmetic processing unit may be used, provided that it can change the modulation function of the wireless device by software.

Further, though a clock signal (Clk) is supplied from digital processing block 240 to analog processing block 250 in FIG. 4, it may be directly supplied from reference clock I/O block 230 to analog processing block 250.

In the present embodiment, digital processing block 240 and analog processing block 250 are shown separately for clearer description. Physically, however, these blocks may be mounted together on one chip.

(Reference Clock I/O Block)

Reference clock I/O block 230 supplies a clock signal for defining the operation of digital processing block 240, or a clock signal for generating carrier wave, to digital processing block 240.

In "external synchronization mode," reference clock I/O block 230 supplies, through a driver 234, a clock signal to digital processing block 240, based on a synchronization signal applied from an external clock generator to an external synchronization link port 220.

In "external clock mode," reference clock I/O block 230 selects an external click signal applied to an external clock port 221 by a multiplexer 232, synchronization between the external clock and a clock signal output from a PLL (Phase Locked Loop) circuit 233 is established, and the synchronized clock signal is supplied to digital processing block 240 and the like.

On the other hand, in "internal clock mode," reference clock I/O block 230 selects an internal clock signal generated by an internal clock generator 231 by a multiplexer 232, synchronization between the internal clock and the clock signal output from PLL (Phase Locked Loop) circuit 233 is established, and the synchronized clock signal is supplied to digital processing block 240 and the like.

It is noted that by the signal output from processor 241 through wireless I/F 210, internal state (for example, "PLL control signal") of the transmitter may be monitored. Wireless I/F 210 may also receive input of other data to be emitted from indoor transmitter 200-1. The said other data includes, for example, data indicating the place where indoor transmitter 200-1 is installed (positional data), and it may be text data. If indoor transmitter 200-1 is installed in commercial facility such as a department store, for example, advertisement data may be input as said other data, in indoor transmitter 200-1.

When input to indoor transmitter 200-1, a code pattern of the pseudo spread code (PRN code) is written in a predefined area of EEPROM 243. Thereafter, the written PRN-ID is included in the signals for positioning. Other data are also written to areas ensured in advance in accordance with the data type, in EEPROM 243.

In the foregoing, the two signals transmitted from two transmission antennas are described as synchronized on the transmitting side. It is desirable that the signal frequency, code period and timing of data to be multiplexed are fully synchronized, as described above, since tracking becomes easier at the time of signal acquisition on the receiver side. If synchronization of one of the signals is established, very fast acquisition of the other signal is possible with the same timing and frequency. Such synchronization is also advantageous at the time of alignment recovery after a loss of signal caused by multipath. Timing synchronization of these two signals, however, is not absolutely necessary. If these are out of synchronization, it is possible to establish synchronization of two channels on the receiving side.

(Data Structure of Data Stored in EEPROM 243)

Figure 5:
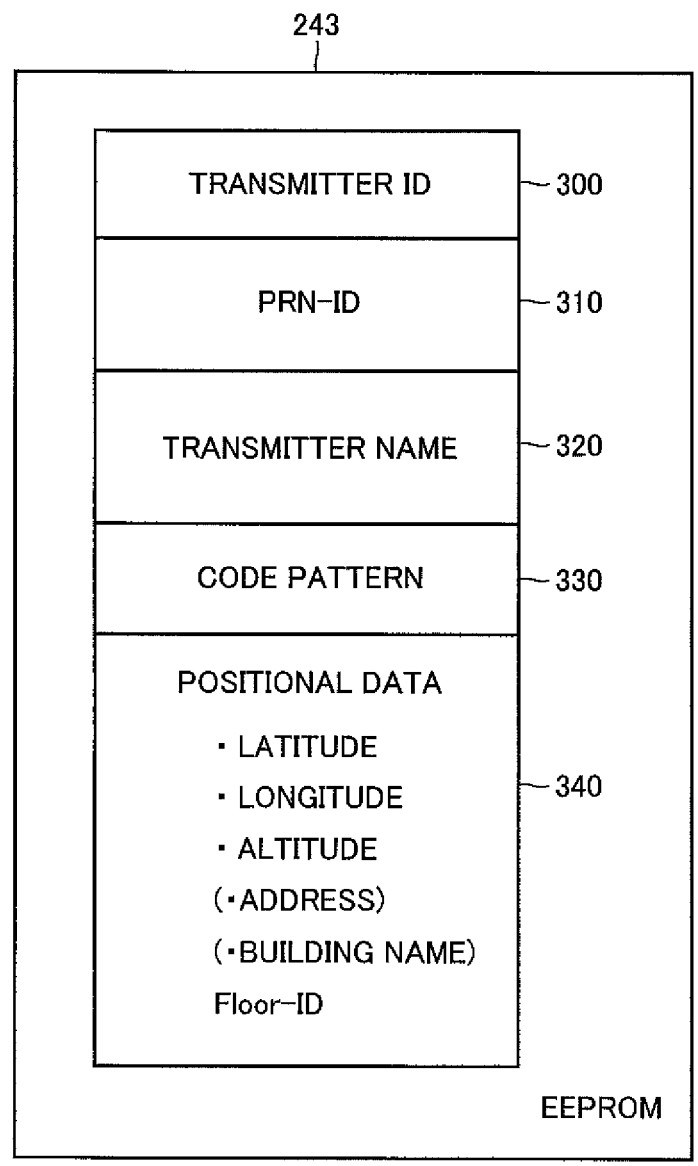
FIG. 5 schematically shows a manner of data storage in an EEPROM 243 provided in indoor transmitter 200-1.

Referring to FIG. 5, data structure of data stored in EEPROM 243 of indoor transmitter 200-1 will be described.

FIG. 5 is a conceptual illustration showing a manner of data storage in EEPROM 243 provided in indoor transmitter 200-1. EEPROM 243 includes areas 310 to 340 for storing data.

Area 300 stores a transmitter ID, as a number for identifying the transmitter. A transmitter ID is, for example, numerals and/or alphabets or other combination written in non-volatile manner in the memory, when the transmitter is manufactured.

A PRN-ID of a pseudo spread code allotted to the transmitter is stored in an area 310. The name of the transmitter is stored as text data in an area 320.

Code patterns of the two pseudo spread codes allotted to the transmitter are stored in an area 330. The code pattern of the pseudo spread code is selected from a plurality of finite number of code patterns allotted beforehand to the positional information providing system in accordance with the one or more embodiments of the present invention, from among code patterns belonging to the same sequence as the pseudo spread codes for satellites. The code pattern is different from the code pattern of the pseudo spread code allotted to each satellite.

The code patterns of the pseudo spread code allotted to the present positional information providing system are finite in number. The number of indoor transmitters is different dependent on the largeness of installation site of the transmitters or the structure of installation site (for example, floor number of a building). A plurality of indoor transmitters larger in number than the number of code patterns may possibly be used. Therefore, there may be a plurality of transmitters having the same code pattern of the pseudo spread code. In that case, the site of installation of the transmitters having the same code pattern may be determined in consideration of signal output. This prevents simultaneous reception of a plurality of positioning signals using the same code pattern of pseudo spread code by the same positional information providing apparatus.

Positional data for specifying the location where indoor transmitter 200-1 is installed is stored in an area 340. The positional data is represented, by way of example, as a combination of latitude, longitude and altitude. In area 320, in addition to or in place of the positional data, an address or a name of building may be stored. In one or more embodiments of the present invention, the data that can by itself identify the location where indoor transmitter 200-1 is installed, such as "combination of latitude, longitude and altitude," "combination of address and name of the building" or "combination of latitude, longitude and altitude and address and name of the building" will be generally referred to as "position specifying data."

Here, the PRN-ID, the name of communication device, the code pattern of pseudo spread code and the position specifying data may be changed to other data input through wireless interface 210.

(Configuration of FPGA 245)

In the following, a circuit realized by FPGA 245 shown in FIG. 4 will be described.

Figure 6:
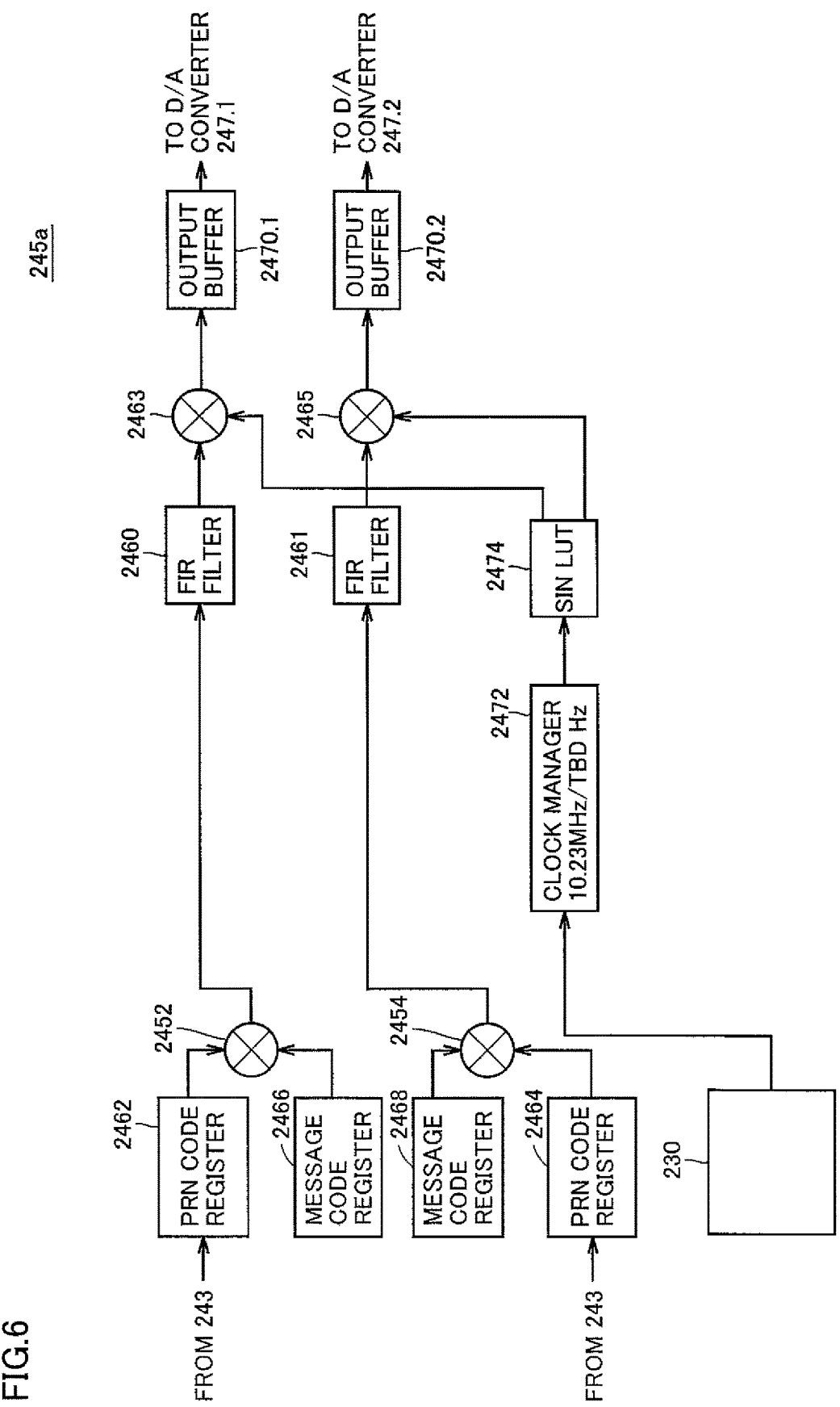

FIG. 6 is a functional block diagram showing, of the circuits realized by FPGA 245, a modulator 245a for modulating a baseband signal of C/A (coarse/access) code as a positioning signal carried on a L1 band (1575.42 MHz) of a carrier wave of the current GPS signal, in accordance with its signal format.

If modulation in accordance with a baseband signal of L1C code as a positioning signal used in the L1 band of a new positioning satellite system (for example, quasi-zenith satellite system of Japan) is to be done, FPGA 245 is programmed to have a configuration corresponding to signal modulation of two phases (I-phase and Q-phase) that are subjected to quadrature modulation. Therefore, though one sequence of positioning codes is shown as an example in FIG. 6, quadrature modulation of two sequences takes place in the "new positioning satellite system" mentioned above. One or more embodiments of the present invention is also applicable to such examples using a plurality of sequences.

Here, assume that BPSK (Binary Phase Shift Keying) modulation is done for the C/A code and that QPSK (Quadrature Phase Shift Keying) modulation is done for the L1C code. As will be made clear in the following description, the method of modulation for converting a digital value to an analog signal is not limited to BPSK or QPSK, and any other method that can be realized by FPGA 245 may be used.

In the following, a configuration for generating a baseband signal of C/A code will be described as an example, and the example shown in FIG. 6 basically has a configuration of a BPSK modulator. It is noted, however, that in accordance with modulating methods variably realized by modulator 245a, circuits independent for respective methods may be programmed.

Referring to FIG. 6, modulator 245a includes: PRN code registers 2462 and 2464 receiving and storing PRN codes stored in EEPROM 243; and message code registers 2466 and 2468 receiving and storing message data in accordance with a signal format of C/A code from a message data generator (not shown), based on positional data stored in EEPROM 243.

Here, in PRN code registers 2462 and 2464, PRN codes set in EEPROM 243 from the outside are input, and in message code registers 2466 and 2468, data of different spread codes (PRN codes) are stored, respectively.

Modulator 245a further includes: a multiplier 2452 multiplying time-sequential data read from PRN code register 2462 by time-sequential data read from message code register 2466; a multiplier 2454 multiplying time-sequential data read from PRN code register 2464 by time-sequential data read from message code register 2468; an FIR filter 2460 functioning as a band-pass filter for the output from multiplier 2452; and an FIR filter 2461 functioning as a band-pass filter for the output from multiplier 2454.

Modulator 245a further includes: a clock manager circuit 2472 for generating modulation reference clock in accordance with a signal format based on the clock signal from reference clock I/O block 230; a look-up table 2474 outputting data corresponding to a preset sine wave in synchronization with the signal from clock manager circuit 2472; a multiplier 2463 multiplying a signal corresponding to the sine wave output from look-up table 2474 by a signal from FIR filter 2460; a multiplier 2465 multiplying a signal corresponding to the sine wave output from look-up table 2474 by a signal from FIR filter 2461; and output buffers 2470.1 and 2470.2 for buffering and outputting the signals from multipliers 2463 and 2465 to D/A converters 247.1 and 247.2, respectively.

Here, if modulator 245a as such is adapted to have a circuit configuration that outputs a signal compatible with the current GPS signal (signal compatible with L1 C/A code: L1 C/A compatible signal) by a firmware of FPGA 245, modulator 245a modulates the information of "latitude, longitude and altitude" of the transmitter as a message, and thereby generates a BPSK modulated signal. Here, "compatible signal" means a signal that has a common signal format and hence receivable by a common front end by the receiver. The "altitude information" represents height of a location where indoor transmitter 200 is installed. It may be data of height above sea level, or floor number of a building, or floor number underground. Alternatively, the "altitude information" may be data (Floor ID) for identifying the floor of a building.

(Data Structure of a Signal Transmitted from Indoor Transmitter 200-1)

In the following, a structure of a signal compatible with L1 band C/A code carrying the message generated by message data generator 245b will be described as an example.

(L1 C/A Compatible Signal)

Figure 7:
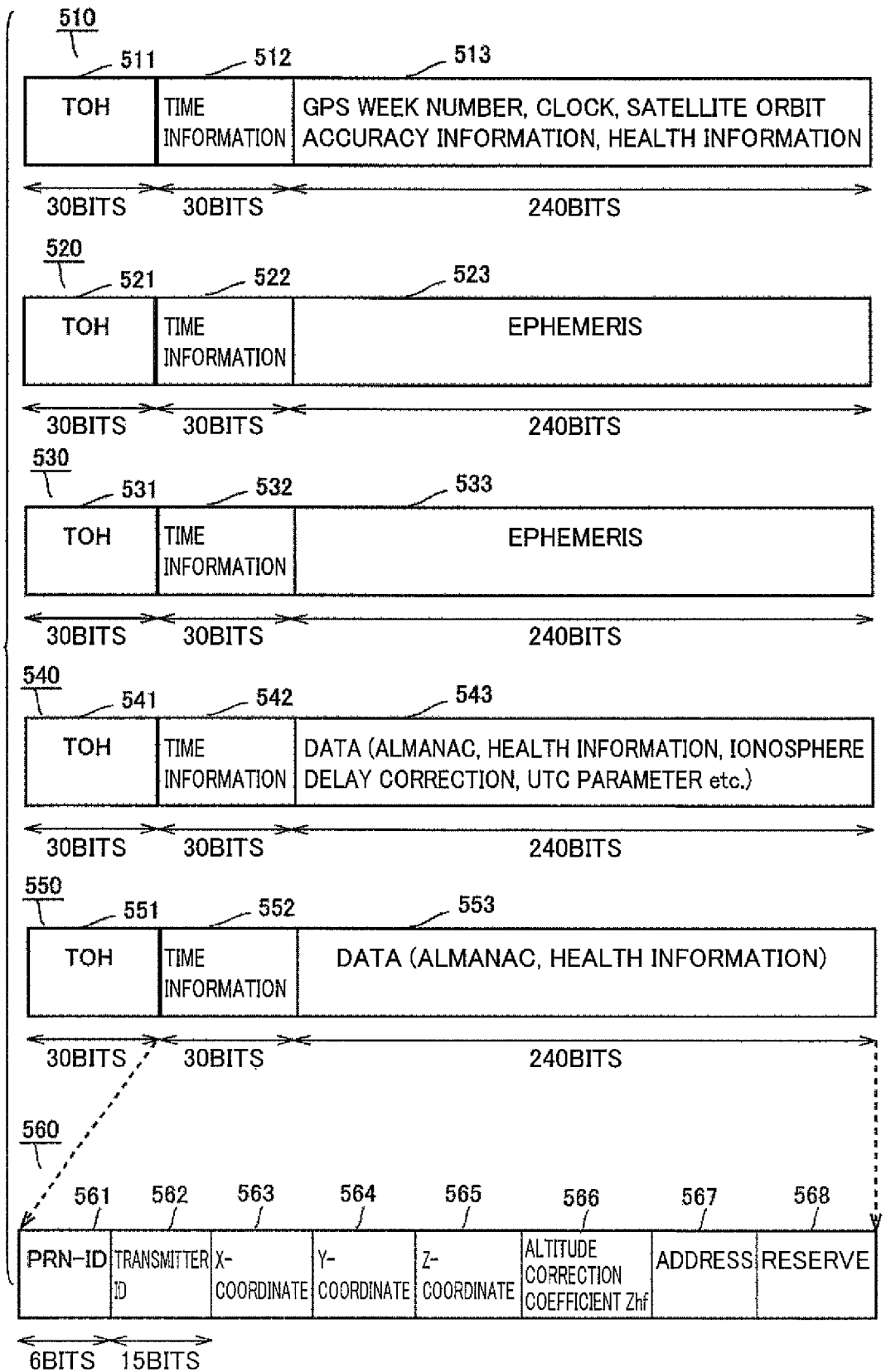
FIG. 7 shows configuration of a signal 500 emitted from a transmitter mounted on a GPS satellite.

Referring to FIG. 7, the positioning signal transmitted from the transmitter will be described. FIG. 7 shows a structure of a signal 500 emitted by a transmitter mounted on a GPS satellite. Signal 500 is formed of five sub frames of 300 bits, that is, sub frames 510 to 550. Sub frames 510 to 550 are repeatedly transmitted by the transmitter. Sub frames 510 to 550 each include 300 bits, and transmitted at the bit rate of 50 bps (bit per second). Therefore, in this example, each sub frame is transmitted in 6 seconds.

The first sub frame 510 includes a transport overhead 511 of 30 bits, time information 512 of 30 bits, and message data 513 of 240 bits. Time information 512 specifically includes time information obtained when sub frame 510 is generated, and a sub frame ID. Here, sub frame ID represents an identification number for distinguishing the first sub frame 510 from other sub frames. Message data 513 includes GPS week number, clock information, health information of the GPS satellite, and orbit accuracy information.

The second sub frame 520 includes a transport overhead 521 of 30 bits, time information 522 of 30 bits, and message data 523 of 240 bits. Time information 522 has the same structure as time information 512 of the first sub frame 510. Message data 523 includes ephemeris. Here, the ephemeris (broadcast ephemeris) represents orbit information of the satellite emitting the positioning signal. The ephemeris is highly precise information updated successively by a control station overseeing the satellite navigation.

The third sub frame 530 has the same structure as that of the second sub frame 520. Specifically, the third sub frame 530 includes a transport overhead 531 of 30 bits, time information 532 of 30 bits, and message data 533 of 240 bits. Time information has the same structure as that of time information 512 of the first sub frame 510. Message data 533 includes ephemeris.

The fourth sub frame 540 includes a transport overhead 541 of 30 bits, time information 542 of 30 bits, and message data 543 of 240 bits. Different from other message data 513, 523 and 533, message data 543 includes almanac information, summary of satellite health information, ionospheric delay information, UTC (Coordinated Universal Time) parameter and the like.

The fifth sub frame 550 includes a transport overhead 551 of 30 bits, time information 552 of 30 bits, and message data 553 of 240 bits. Message data 553 includes almanac information and the summary of satellite health information. Message data 543 and 553 each consist of 25 pages, and on each page, different pieces of information described above are defined. Here, the almanac information represents schematic orbit of satellites and, it includes information not only of the corresponding satellite but also that of all GPS satellites. When transmission of sub frames 510 to 550 is repeated 25 times, the process returns to the first page, and emission of the same pieces of information restarts.

Sub frames 510 to 550 are transmitted from each of the transmitters 120, 121 and 122. When sub frames 510 to 550 are received by positional information providing apparatus 100, the position of positional information providing apparatus 100 is calculated based on each piece of maintenance/management information included in transport overheads 511 to 551, time information 512 to 552 and message data 513 to 553.

A signal 560 has the same data length as each of the message data 513 to 553 included in sub frames 510 to 550. The signal 560 is different from sub frames 510 to 550 in that in place of the orbit information represented as ephemeris (message data 523, 533), it has data representing the position of emission source of the signal 560.

Specifically, signal 560 includes PRN-ID 561 of 6 bits, a transmitter ID 562 of 15 bits, an X-coordinate value 563, a Y-coordinate value 564, a Z-coordinate value 565, an altitude correction coefficient (Zhf) 566, an address 567, and a reserve area 568. Signal 560 is transmitted from indoor transmitters 200-1, 200-2 and 200-3, in place of message data 513 to 553 included in sub frames 510 to 550.

PRN-ID 561 is an identification number of code patterns of a group of pseudo noise codes allotted beforehand to transmitters (for example, indoor transmitters 200-1, 2003 and 200-3) as the emission source of the signal 560. Though PRN-ID 561 is different from the identification number of code patterns of the group of pseudo noise codes allotted to respective transmitters mounted on the GPS satellites, these are the numbers allotted to the code patterns generated from a series of codes of the same sequence. When the positional information providing apparatus obtains any of the code patterns of pseudo noise codes allotted to indoor transmitters, from the received signal 560, it becomes possible to specify whether the signal corresponds to the sub frame 510 to 550 transmitted from a satellite, or the signal 560 transmitted from an indoor transmitter.

X-coordinate value 563, Y-coordinate value 564, and Z-coordinate value 565 are data representing the position where indoor transmitter 200-1 is mounted. X-coordinate value 563, Y-coordinate value 564, and Z-coordinate value 565, by way of example, indicate latitude, longitude and altitude, respectively. Altitude correction coefficient 566 is used for correcting the altitude specified by Z-coordinate value 565. Altitude correcting coefficient 566 is not an essential data item. Therefore, if accuracy higher than the altitude specified by Z-coordinate value 565 is unnecessary, the coefficient may not be used. In that case, data of "NULL", for example, is stored in the area allotted to altitude correcting coefficient 566.

By way of example, "address and name of the building," "advertisement data," "traffic information," "weather information" or "disaster information" may be allocated in reserve area 568, and other data may be allocated.

As described above, the signal transmitted from indoor transmitter 200 may be a "L1C compatible signal" that corresponds to a positioning signal from a new positioning satellite.

[Configuration of Positional Information Providing Apparatus 100-1 (Receiver)]

Figure 8:
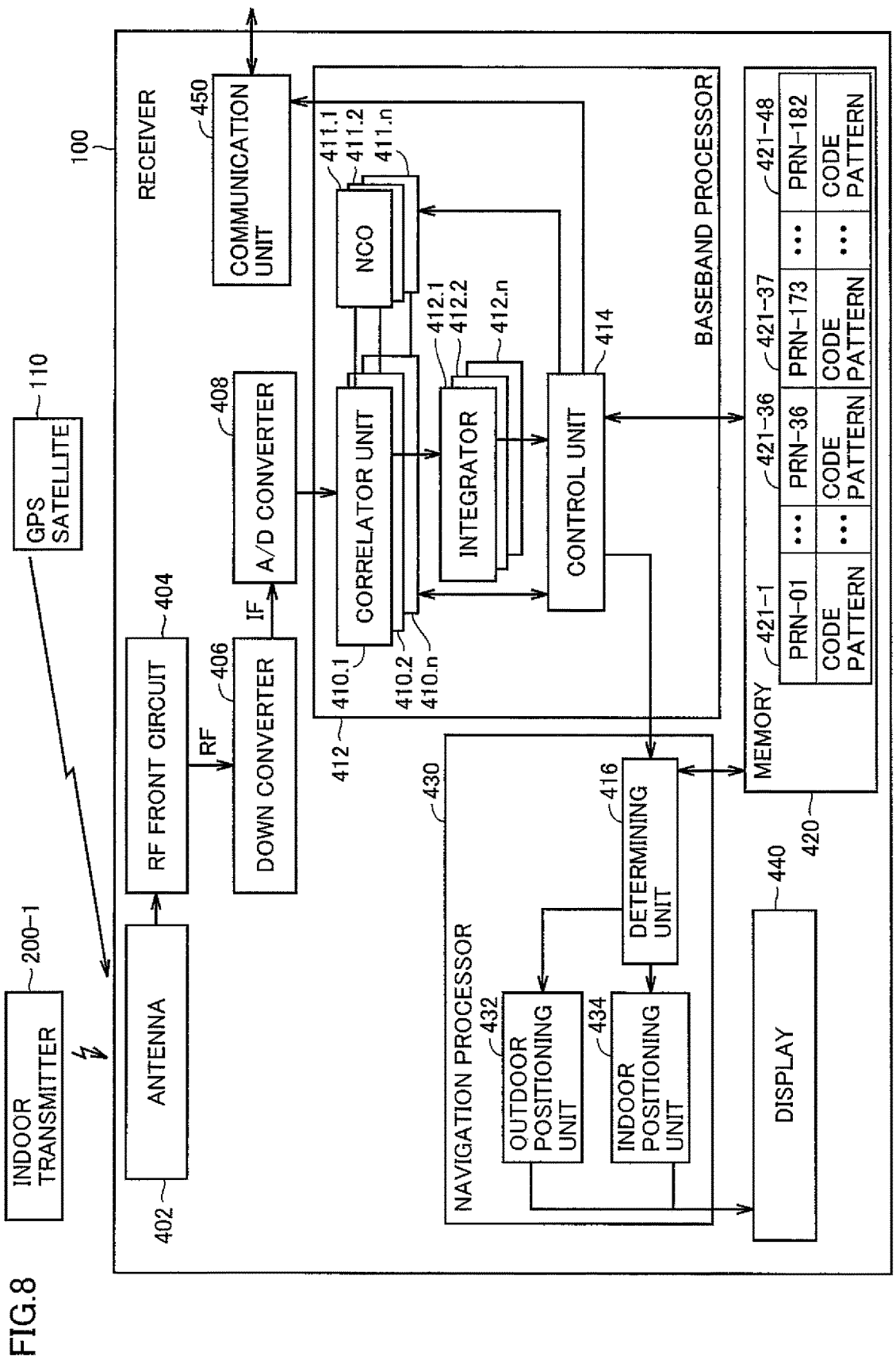
FIG. 8 is a block diagram showing a hardware configuration of positional information providing apparatus 100.

Referring to FIG. 8, positional information providing apparatus 100 will be described. FIG. 8 is a block diagram showing hardware configuration of positional information providing apparatus 100.

Positional information providing apparatus 100 includes an antenna 402, an RF (Radio Frequency) front circuit 404 electrically connected to antenna 402, a down converter 406 electrically connected to RF front circuit 404, an A/D (Analog to Digital) converter 408 electrically connected to down converter 406, a baseband processor 412 receiving a signal from A/D converter 408 and performing correlation processing, a memory 420 electrically connected to baseband processor 412, a navigation processor 430 electrically connected to baseband processor 412, and a display 440 electrically connected to navigation processor 430.

Baseband processor 412 includes: correlator units 410.1 to 410.$n$ electrically connected to A/D converter 408; numerically controlled oscillators (NCO) 411.1 to 411.$n$ for supplying clocks as a reference for the timing of correlation process by correlator units 410.1 to 410.$n$, respectively; and integrators 412.1 to 412.$n$ receiving signals from correlator units 410.1 to 410.$n$, respectively, and performing integration for a prescribed time period.

Baseband processor 412 further includes a control unit 414 decoding signals from integrators 412.1 to 412.$n$ and controlling operations of correlator units 410.1 to 410.$n$, NCOs 411.1 to 411.$n$ and integrators 412.1 to 412.$n$, based on the software stored in memory 420.

Generally, baseband processor 412 performs the correlation process in consideration of Doppler effect of the received signals, and performs not only the search for the PRN code and the delay component thereof but also the search for frequency, by controlling frequencies of NCOs 411.1 to 411.$n$, under the control of control unit 414.

In the example shown in FIG. 8, correlator units 410.1 to 410.$n$ and integrators 412.1 to 412.$n$ may be implemented as hardware independent from baseband processor 412. Alternatively, the functions of correlator units 410.1 to 410.$n$ and integrators 412.1 to 412.$n$ may be realized by software.

Memory 420 includes a plurality of areas for storing code patterns of PRN codes as data for identifying each emission source of the positioning signal. By way of example, according to an aspect, when 48 code patterns are used, memory 420 includes areas 421-1 to 421-48, as shown in FIG. 8. According to another aspect, when a larger number of code patterns are used, larger number of areas are secured in memory 420. On the contrary, it is also possible that code patterns smaller in number than the areas secured in memory 420 are used.

Consider an example in which 48 code patterns are used. Here, if 24 satellites are used for the satellite positioning system, 24 identification data for identifying respective satellites and 12 spare data are stored in areas 421-1 to 421-36. Here, in area 421-1, for example, a code pattern of the pseudo noise code for the first satellite is stored. By reading the code pattern from here and performing cross-correlation process with the received signal, signal tracking and deciphering of navigation message included in the signal become possible. Though a method in which the code pattern is stored and read has been described as an example here, a method is also possible in which the code pattern is generated by a code pattern generator. The code pattern generator is realized, for example, by combining two feedback registers. Structure and operation of the code pattern generator are readily understood by a person skilled in the art. Therefore, detailed description thereof will not be repeated here.

Similarly, the code patterns of the pseudo noise code allotted to indoor transmitters emitting positioning signals are stored in areas 421-37 to 421-48. For example, the code patterns of the pseudo noise code allotted to the first indoor transmitter are stored in areas 421-37 and 421-38. According to one or more embodiments of the present invention, which spread codes (PRN codes) are allocated as a set for one indoor transmitter is stored in advance in memory 420. If such allocation is stored in advance, acquisition of two channels can be done in a shorter time period.

In the present embodiment, indoor transmitters having 12 code patterns are usable. Here, indoor transmitters may be arranged such that indoor transmitters having the same code pattern are not placed in a scope of coverage of one positional information providing apparatus. By such an arrangement, it becomes possible to install indoor transmitters larger in number than 6 on one floor of the building 130.

Navigation processor 430 includes: a determining unit 416 determining the emission source of the positioning signal based on data output from control unit 414, determining whether the received positioning signal has been transmitted by diversity transmission and controlling the operation of control unit 414; an outdoor positioning unit 432 for measuring the outdoor position of positional information providing apparatus 100 based on the signal output from determining unit 416 based on the software stored in memory 420; and an indoor positioning unit 434 for extracting information representing indoor position of positional information providing apparatus 100 based on the data output from determining unit 416.

Antenna 402 can receive positioning signals emitted from GPS satellites 110, 111 and 112, respectively, and a positioning signal emitted from indoor transmitter 200-1. Further, when positional information providing apparatus 100 is implemented as a portable telephone, antenna 420 can transmit/receive signal for wireless telephone or data for data communication, in addition to the signals mentioned above.

A filter and an LNA (Low Noise Amplifier) circuit of RF front circuit 404 receive the signals received by antenna 402 and perform noise reduction, or filtering process for outputting signals only in a predefined bandwidth. The signal output from RF front circuit 404 is input to down converter 406.

Down converter 406 amplifies the signal output from RF front circuit 404, and outputs it as an intermediate frequency signal. The signal is input to A/D converter 408. A/D converter 408 performs digital conversion of the input intermediate frequency signal, to a digital data. The digital data is input to correlator units 410.1 to 410.n.

Correlator units 410.1 to 410.n perform correlation process between the received signal and the code pattern read by control unit 414 from memory 420.

Each of correlator units 410.1 to 410.n simultaneously execute matching between the received positioning signal and the code patterns generated for demodulating the positioning signal, based on the control signal output from control unit 414.

Specifically, control unit 414 issues a command to each of the correlator units 410.1 to 410.n to generate code patterns (replica patterns) reflecting a delay (with shifted code phase) possibly experienced on the pseudo noise code. The command leads to patterns of the number of satellites×2×1023 (length of code pattern of the used pseudo noise code) for current GPS. Each of the correlator units 410.1 to 410.n generates, based on the command applied to it, code patterns having different code phases, using the code pattern of pseudo noise code defined for each satellite. Then, it follows that among all the generated code patterns, there is one pattern that matches the code pattern of the pseudo noise code used for modulating the received positioning signal. Therefore, by preparing beforehand correlator units of the necessary number for matching process using respective code patterns in the form of parallel correlator units 410.1 to 410.n, a code pattern of the pseudo noise code can be specified in a very short time period. This process is similarly applicable when positional information providing apparatus 100 receives a signal from an indoor transmitter. Therefore, even when the user of positional information providing apparatus 100 stays indoors, the positional information can be obtained in a very short period of time.

Specifically, parallel correlator units 410.1 to 410.n are capable of executing, in parallel, matching process between the code pattern of pseudo noise codes defined for each of the satellites and up to all the code patterns of pseudo noise codes defined for each of the indoor transmitters. Even when collective matching on all code patterns of the pseudo noise codes defined for the satellites and indoor transmitters is not carried out because of a relation between the number of correlator units and the number of code patterns of pseudo noise codes allotted to the satellites and indoor transmitters, the time necessary for acquiring positional information can significantly be reduced through parallel processing by the plurality of correlator units.

Here, the satellites and indoor transmitters transmit signals using the same communication method of spread spectrum technique, and the same sequence of code patterns of pseudo noise codes can be allocated to the satellites and indoor transmitters. Therefore, parallel correlator units can be used both for the signals transmitted from satellites and those transmitted from indoor transmitters. Thus, receiving process can be done in parallel, without necessitating any distinction between these.

Using each code pattern, parallel correlator units 410.1 to 410.n track the positioning signal received by positional information providing apparatus 100, and specify a code pattern that has a sequence matching the bit sequence of the positioning signal. Consequently, the code pattern of the pseudo noise code is specified and, therefore, determining unit 416 can determine from which satellite or from which indoor transmitter the received positioning signal has been transmitted. If the received positioning signal is transmitted from an indoor transmitter, determining unit 416 also determines whether or not the positioning signal has been transmitted utilizing diversity transmission. Further, it is possible for positional information providing apparatus 100 to demodulate and decipher the message, using the specified code pattern.

Specifically, determining unit 416 makes such determination as described above, and transmits data in accordance with the result of determination to navigation processor 430. Determining unit 416 determines whether the PRN-ID included in the received positioning signal is the PRN-ID allotted to the transmitter, such as indoor transmitter 200-1, other than the transmitter mounted on the GPS satellite.

Here, an example will be described in which 24 GPS satellites are used in the positioning system. Here, 36 pseudo noise codes, including spare codes, are used. In this example, PRN-01 to PRN-24 are used as numbers (PRN-ID) for identifying respective GPS satellites, and PRN-25 to PRN-36 are used as numbers for identifying spare satellites. The spare satellite refers to a satellite launched in addition to the originally launched satellites. Specifically, such a satellite may be launched in case a GPS satellite or a transmitter or the like mounted on a GPS fails.

Further, it is assumed that 12 code patterns of pseudo noise code are allotted to transmitters, such as indoor transmitter 200-1 and the like, other than the transmitters mounted on the GPS satellites. Here, numbers different from PRN-IDs allotted to the satellites, for example, PRN-37 to PRN-48, are allotted to respective transmitters. Therefore, it follows that in the present example, there are 48 PRN-IDs. Here, PRN-37~PRN-48 are allotted to indoor transmitters in accordance with the arrangement of indoor transmitters. Therefore, if used transmission output is not high enough to cause interference of signals emitted from each of the indoor transmitters, the same PRN-ID may be used for different indoor transmitters. This arrangement allows use of transmitters larger in number than the PRN-IDs allotted for the transmitters on the ground.

Therefore, determining unit 416 makes a reference to code pattern 422 of the pseudo noise code stored in memory 420 to determine whether the code pattern obtained from the received positioning signal matches the code pattern allotted to the indoor transmitter. If these code patterns match, determining unit 416 determines that the positioning signal has been emitted from the indoor transmitter. Otherwise, determining unit 416 determines that the signal has been emitted from a GPS satellite, and determines, with reference to the code patterns stored in memory 402, to which GPS satellite the obtained code pattern has been allotted. Though an example in which the code pattern is used for determination has been described, the determination may be made by comparison of other data. For example, comparison using PRN-ID may be used for the determination.

If the received signal is emitted from each GPS satellite, determining unit 416 transmits the data obtained from the specified signal to outdoor positioning unit 432. The data obtained from the signal includes navigation message. If the received signal is emitted from indoor transmitter 200-1 or the like, determining unit 416 transmits the data obtained from the signal to indoor positioning unit 434. The data represents coordinate values set in advance, as data for specifying the position of indoor transmitter 200-1. According to another aspect, a number identifying the transmitter may be used.

In navigation processor 430, outdoor positioning unit 432 executes a process for calculating the position of positional information providing apparatus 100 based on the data transmitted from determining unit 416. Specifically, using data included in signals emitted from three or more (according to one or more embodiments of the present invention, four or more) GPS satellites, outdoor positioning unit 432 calculates propagation time of each signal, and based on the result of calculation, finds the position of positional information providing apparatus 100. The process is executed by a known method of satellite positioning. The process can be readily understood by a person skilled in the art, and therefore, detailed description thereof will not be repeated here.

On the other hand, in navigation processor 430, indoor positioning unit 434 executes a positioning process when the positional information providing apparatus 100 exists indoors, based on the data output from determining unit 416. As will be described later, indoor transmitter 200-1 emits a positioning signal including data (position specifying data) for specifying a location. Therefore, if the positional information providing apparatus 100 receives such a signal, the data may be taken out from the signal, and the data may be used as the position of positional information providing apparatus 100. Indoor positioning unit 434 performs this process. The data calculated by outdoor positioning unit 432 or indoor positioning unit 434 are used for display on display 440. Specifically, the data are incorporated in the data for displaying an image, and an image representing the measured position or displaying the location where indoor transmitter 200-1 is installed is generated and displayed on display 440.

Positional information providing apparatus 100 has a communication unit 450 for exchanging data with the outside, for example, with a positional information providing server (not shown), under control of control unit 414.

In the configuration shown in FIG. 8, though not specifically limiting, in the signal processing from reception of a positioning signal to generation of information to be displayed on the display, antenna 402, RF front circuit 404, down converter 406 and A/D converter 408 are implemented by hardware, and the processes of baseband processor 412 and navigation processor 430 may be executed by a program stored in memory 420. Processes of correlator units 410.1 to 410.n and integrators 412.1 to 412.n may be realized by software, in place of hardware.

(Process Flow of Indoor Positioning)

Figure 9:
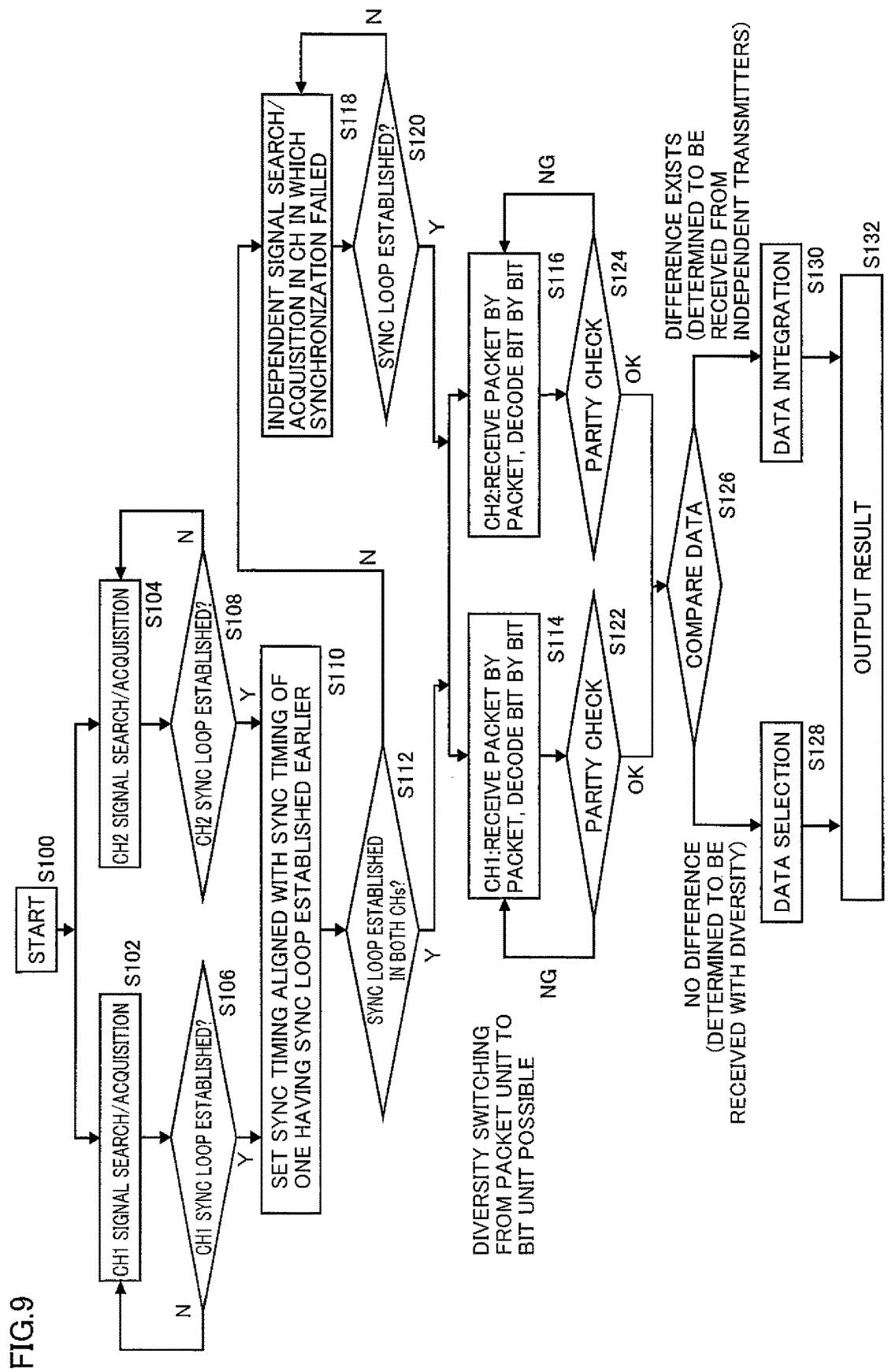
FIG. 9 is a chart representing a process executed by a control unit 414, a determining unit 416 and an indoor positioning unit 434.

FIG. 9 represents the process executed by control unit 414, determining unit 416 and indoor positioning unit 434.

If it is determined by determining unit 416 that the spread code of acquired positioning signal is any of the codes possibly allotted to an indoor transmitter 200, indoor positioning unit 434 executes the process of positioning operation among the processes shown in FIG. 9.

If it is determined by determining unit 416 that the spread code of acquired positioning signal is any of the codes possibly allotted in advance to a GPS satellite, outdoor positioning unit 432 measures the current position of positional information providing apparatus 100 through the same process as the common GPS positioning. The branch for executing the common GPS signal processing is not shown in FIG. 9.

Referring to FIG. 9, when the receiving process starts (step S100), under the control of control unit 414, correlator units 410.1 to 410.n perform the correlation process on possible spread codes (PRN codes), so that control unit 414 executes acquisition and synchronizing processes in parallel. By way of example, in the present embodiment, indoor transmitter 200 performs search and acquisition processes in parallel and asynchronously, on two channels CH1 and CH2, which correspond to the signals transmitted from transmission antennas TX-ANT1 and TX-ANT2 (steps S102, S104). Here, the "channel" refers to a communication path between one transmission antenna and positional information providing apparatus 100, to which channel the correlator unit corresponds. Further, "asynchronously" means that the receiving process is executed without specifically establishing any link or correspondence between the information related to timing of reception in the tracking and acquisition process for one spread code and the information related to timing of reception in tracking and acquisition process for another spread code.

The search and acquisition process as such is continued under the control of control unit 414 until acquisition is completed and synchronization loop is established for any of the channels (steps S106, S108).

If the synchronization loop is established early for one of the channels CH1 and CH2 and if it is determined by determining unit 416 that the channel corresponds to the positioning signal from indoor transmitter 200, control unit 414 executes the search and acquisition process timed with this timing of synchronization for the other channel CH2 (step S110). Specifically, using the information related to timing of reception of the spread code used for establishing synchronization loop in one channel, the tracking and acquisition process is executed assuming that the spread code of the other channel also has the time delay corresponding to the timing of reception.

If positional information providing apparatus 100 stores in advance which spread codes form a pair for one indoor transmitter, and if one channel is successfully acquired, then it can be known which PRN code corresponds to the other channel. Thus, faster acquisition of the other channel becomes possible.

Thereafter, if it is determined that the successfully synchronized channel corresponds to a positioning signal from indoor transmitter 200, determining unit 416 determines whether synchronization has been established in both channels within a prescribed time period (step S112).

If it is determined by determining unit 416 that the two channels are both successfully synchronized, the process proceeds to steps S114 and S116.

If it is determined by determining unit 416 that synchronization is established not in both channels, control unit 414 executes the process for tracking and acquisition for the spread code of the other channel independent from the channel of which synchronization has been established, that is, not depending on the information related to the timing of reception of the channel that is successfully synchronized (step S118). If synchronization succeeds in the other channel in this manner, or if synchronization of the other channel is not established within the prescribed time period, the process proceeds to the next steps S114 and S116.

Next, control unit 414 decodes signals of one packet, channel by channel independently, for the acquired channels (steps S114, S116). Control unit 414 executes parity check on the decoded signals (steps S122, S124), and if synchronization loop is established both in the two channels, continues reception and decoding of signals of one packet until both channels successfully pass the parity check.

If synchronization loop is established for the two channels and both channels pass the parity check, determining unit 416 compares the data contents in the packets received through the two channels (step S126).

If the data contents in the packets of both channels are the same, determining unit 416 determines that these have been transmitted from indoor transmitter 200 by diversity transmission and received by separate channels, and notifies indoor positioning unit 434 accordingly. On the other hand, if the data contents in the packets do not match, the determining unit determines that positioning signals from two different indoor transmitters are received, and notifies indoor positioning unit 434 accordingly.

When the signals transmitted by diversity transmission are received, indoor positioning unit 434 selects one of the two channels, and based on the positioning signal received by the selected channel, obtains the positional information from the position specifying data in the message (step S128), and outputs the result of positioning (step S132). Here, for the "channel selection," of the two channels, one having higher intensity is selected. Though not limiting, if the intensity of positioning signals from indoor transmitters 200 is made different transmitter by transmitter, a signal transmitted from indoor transmitter 200 may be adapted to include information (intensity information) indicating the rank (for example, any of four ranks) of radio wave intensity set on the side of transmitter. Then, the intensity of received radio wave may be normalized based on the intensity information, and based on the normalized signal, the signal of that channel which is determined to have higher intensity may be selected.

Alternatively, though not limiting, in "channel selection", the channel through which signals having lower error rate are received may be selected.

On the other hand, if signals transmitted from independent, separate indoor transmitters are received, indoor positioning unit 434 integrates the position specifying data of the two channels (step S130), and outputs the result of positioning (step S132).

Here, though not limiting, integration of position specifying data may be done by calculating the position of a halfway point between the positional data of two indoor transmitters.

It is not always necessary to compare data based on the decoded signals of one packet, and the data may be compared with small data unit. By way of example, bits of a specific range following a specific number of bits from the head of a packet may be used for comparison.

Figure 10A:
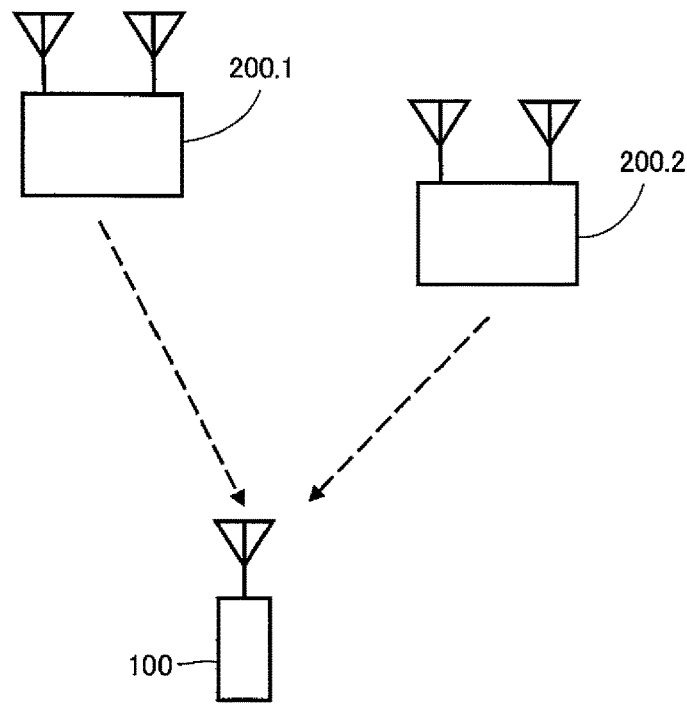
FIG. 10A is an illustration representing a concept of the process for "position specifying data integration" described with reference to FIG. 9.
Figure 10B:
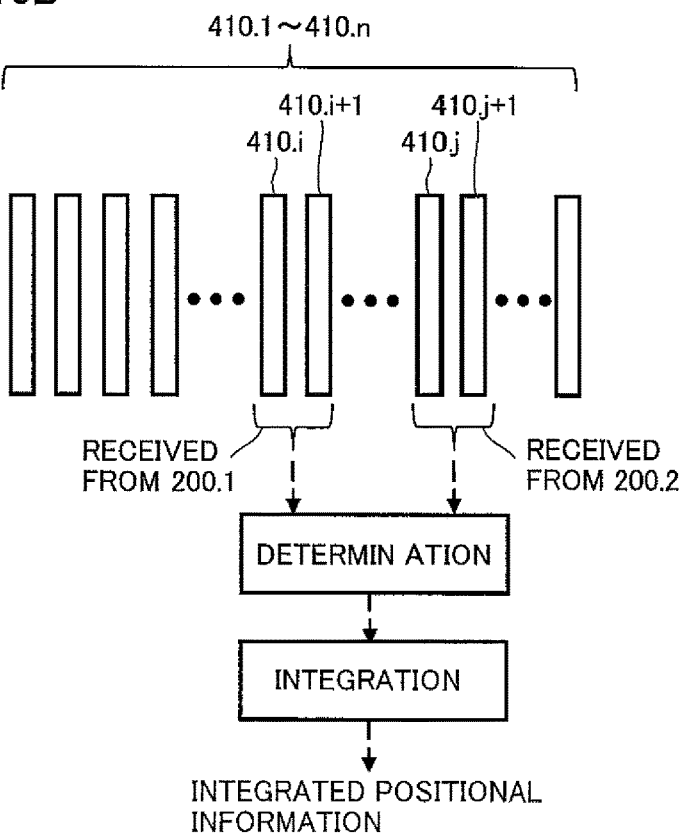
FIG. 10B is an illustration representing a concept of the process for "position specifying data integration" described with reference to FIG. 9.

FIGS. 10A and 10B show concepts of the process for "integration of position specifying data" described with reference to FIG. 9.

First, referring to FIG. 10A, assume that positional information providing apparatus (receiver) 100 is ready to receive positioning signals from two indoor transmitters 200.1 and 200.2, both having intensities not lower than a prescribed level.

Here, FIG. 10B represents the process executed by correlator units 410.1 to 410.$n$, determining unit 416 and indoor positioning unit 434, in the configuration of FIG. 8.

First, among correlator units 410.1 to 410.$n$ operating in parallel, if it is determined that diversity signals from two indoor transmitters 200.1 and 200.2 are received, from positioning signals of respective indoor transmitters, the signal having higher intensity is selected, as in the process at step S128. Here, the signal intensity may be normalized for selection.

Next, indoor positioning unit 434 specifies respective positions based on the positioning signals from two indoor transmitters 200.1 and 200.2. Then, it is determined that positional information providing apparatus 100 exists at a position prorated by the intensity ratio between the positions of two indoor transmitters 200.1 and 200.2. Specifically, positional information providing apparatus 100 is determined to exist at a position prorated by inverse proportion, so that of the two positions, the prorated point exists nearer to the side having higher signal intensity. Here again, normalized signal intensity may be used.

By the process as described above, stable indoor signal reception becomes possible. Further, even indoors, positional information can be provided with the stable accuracy of about a few meters.

The ground time (time of transmitter such as indoor transmitter 200-1) and the satellite time may be independent from each other, and synchronization is unnecessary. Therefore, the cost for manufacturing indoor transmitters is not much increased. Further, after the start of operation of the positional information providing system, it is unnecessary to establish time synchronization of indoor transmitters, and hence operation is easy.

Each signal emitted from each indoor transmitter includes information itself for specifying the location where the transmitter is installed. Therefore, it is unnecessary to calculate positional information based on signals emitted from a plurality of satellites, and therefore, positional information can be extracted from the signal emitted from a single transmitter.

Further, as the signal emitted from a single indoor transmitter is received, the position where the signal is received can be specified. Therefore, as compared with other conventional positioning system such as GPS, the system for providing position can be realized in a simple manner.

Here, positional information providing apparatus 100 does not require dedicated hardware for receiving the signal emitted by indoor transmitter 200, and it can be implemented by hardware for realizing the conventional positioning system, using software for signal processing. Therefore, it is unnecessary to design from scratch the hardware for applying the technique of the present embodiment, and hence, cost increase of positional information providing apparatus 100 can be prevented, promoting wider use. Further, a positional information providing apparatus that does not increase or complicate the circuit scale can be provided.

Specifically, memory 420 of positional information providing apparatus 100 holds PRN-ID defined in advance for the indoor transmitter and/or satellite. Positional information providing apparatus 100 operates based on a program for the process of determining, based on the PRN-ID, whether the received radio wave is emitted from a satellite or from an indoor transmitter. The program is realized by an arithmetic processing unit such as a baseband processor. Alternatively, a circuit element for determination may be changed to a circuit element including functions realized by the program, whereby the positional information providing apparatus 100 can be formed.

If the positional information providing apparatus 100 is implemented as a portable telephone, the obtained information may be held in a non-volatile memory 420 such as a flash memory. At the time of emission from the portable telephone, the data held in memory 420 may be transmitted to the destination. By such an approach, positional information of emission source, that is, the positional information obtained by positional information providing apparatus 100 as the portable telephone from the indoor transmitter, is transmitted to the base station that relays the communication. The base station holds the positional information as communication record, together with the date and time of reception. If the destination is an emergency contact number (110 in Japan), the positional information of emission source may directly be notified. Thus, similar to the conventional notification of emission source of an emergency call from a fixed telephone, notification of an emission source from a mobile body becomes possible.

The positional information providing system in accordance with the present embodiment uses a spread spectrum signal as the signal for positioning. Transmission of this signal can lower electric power per frequency, and therefore, radio wave management could be easier as compared with a conventional RF tag. As a result, construction of positional information providing system becomes easier.

It is possible to change set parameters of indoor transmitter 200-1 after installment, by wireless I/F 210. Therefore, among the pieces of information transmitted as a message, "advertisement data", "traffic information", "weather information", and "disaster information" may be rewritten in real time basis and provided to the receiver. Thus, various services can be realized. In addition, firmware itself of FPGA 245 for signal processing of indoor transmitter 200-1 can be rewritten. Therefore, one hardware may be utilized for various communication methods (modulation methods and the like) of various positioning systems.

Embodiment 2

Figure 11:
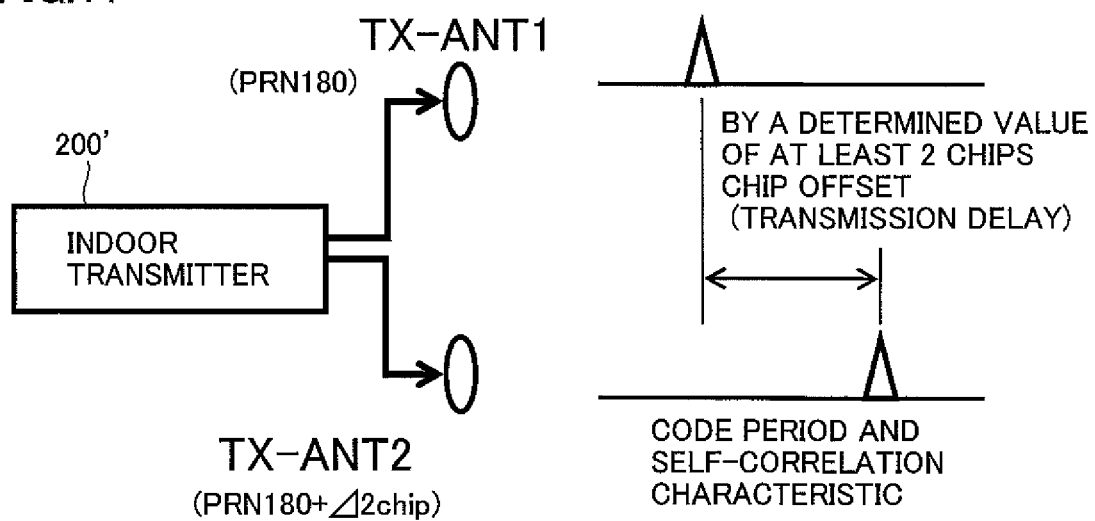
FIG. 11 is a schematic illustration showing a concept of the positioning signal transmitted from indoor transmitter 200 in accordance with Embodiment 2.

FIG. 11 is a schematic illustration showing a concept of the positioning signal transmitted from indoor transmitter 200' in accordance with Embodiment 2.

In indoor transmitter 200' of Embodiment 2, one PRN code is used for two transmission antennas TX-ANT1 and TX-ANT2, and signal selection is done utilizing self-correlation characteristic of the code.

Specifically, frequencies and synchronization of timing of transmission of signals from two transmission antennas TX-ANT1 and TX-ANT2 are maintained, while code period of one of the transmission channels is delayed by at least two chips. The amount of delay must be defined and fixed in the system. Such restriction must be commonly imposed both on the transmitting and receiving sides of the system.

In the following, description will be given assuming that the delay amount is set to the minimum amount of 2 chips (for example, 2 μs).

Generally, when the same codes are transmitted, a phenomenon similar to multipath fading occurs on the receiving side. If there is a delay of one chip or more between the two signals on the receiving terminal, however, two independent correlation peaks appear on the correlator. Typically, the amount of delay in multipath is in the order of a few ns and, it is difficult to separate the correlation peaks. In indoor transmitter 200' of Embodiment 2, the amount of delay is set to be 2 chips or more, to enable separation of correlation peaks.

Figure 12:
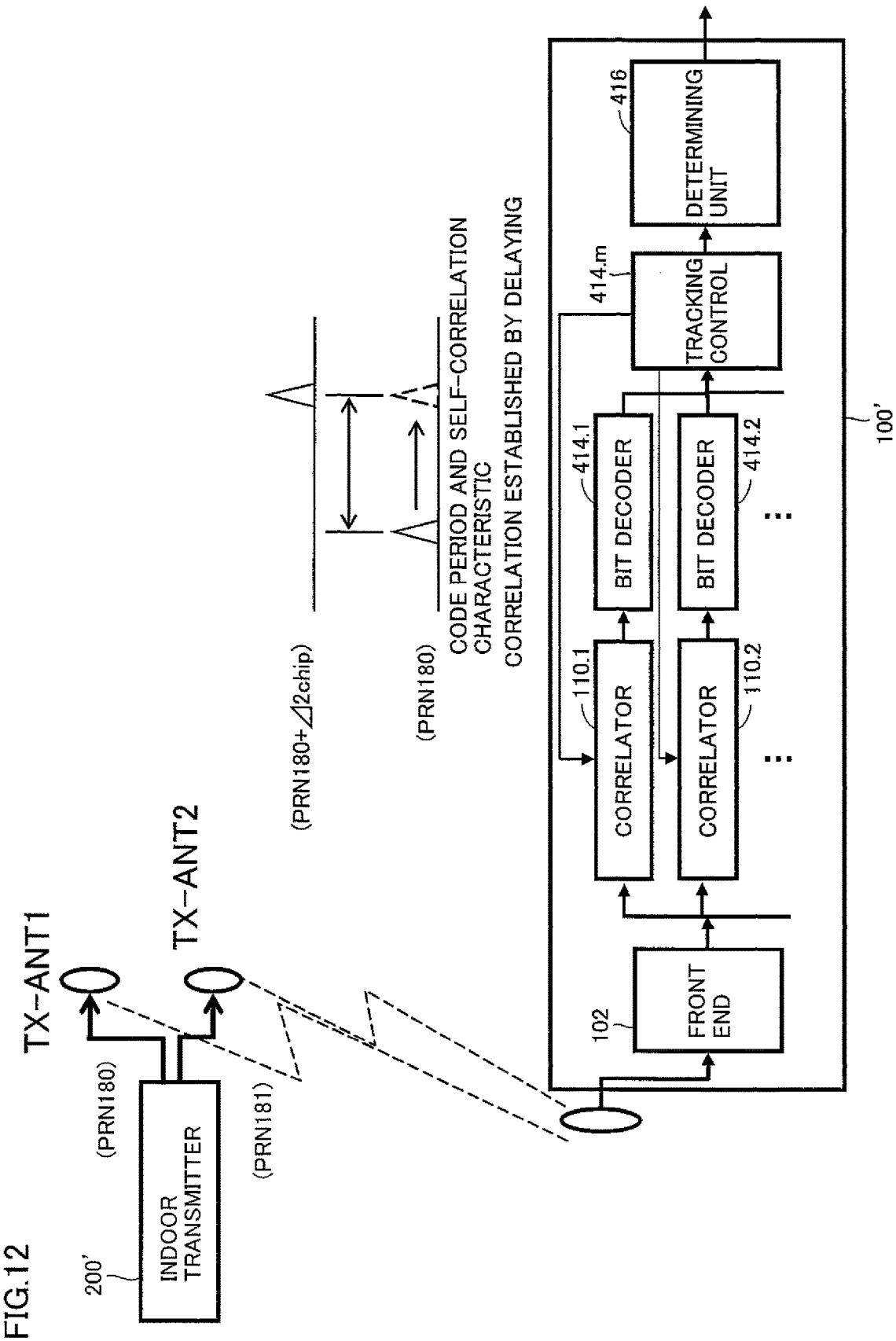
FIG. 12 is an illustration showing schematic configuration and operation of positional information providing apparatus 100' in accordance with Embodiment 2.

FIG. 12 is an illustration showing schematic configuration and operation of positional information providing apparatus 100' in accordance with Embodiment 2.

It is different from the configuration of positional information providing apparatus 100 in accordance with Embodiment 1 shown in FIG. 3 mainly in the following points.

First, in positional information providing apparatus 100' in accordance with Embodiment 2, track control unit 414.*m* realizes such a control that a replica signal of spread code generated for correlation process in correlator 110.2 is delayed by a prescribed amount of delay from correlator 110.1. Track control unit 414.*m* executes similar delaying process for the pairs (sets) of correlators corresponding to other spread codes.

Further, in positional information providing apparatus 100' in accordance with Embodiment 2, when spread codes are first acquired, correlators 110.1 to 110.*n* execute acquisition process for different spread codes, respectively, and if one spread code is acquired and synchronization loop is established, every two correlators form a set, and each set is used for tracking and acquiring the same PRN code. By way of example, correlators 110.1 and 110.2 are used for tracking and acquiring one code PRN 180.

It is noted, however, that tracking control unit 414.*m* determines the amount of delay such that of the two correlators forming a set, one (correlator 110.1) tracks and establishes synchronization of a signal delayed by an amount of delay pre-defined by the system, for example, by 2 chips, from the other (correlator 110.2).

Here, if synchronization loop of one channel is established, information of the frequency of synchronization loop for locking the signal (frequency of local oscillator, such as a PLL oscillator, used for forming a replica signal with synchronized spread code) is passed to the other channel Thus, fast synchronization of the two channels becomes possible.

Except for this point, the configuration of positional information providing apparatus 100' in accordance with Embodiment 2 is the same as that of positional information providing apparatus 100 in accordance with Embodiment 1 and, therefore, description thereof will not be repeated.

Hardware configuration of indoor transmitter 200' in accordance with Embodiment 2 is the same as the hardware configuration of indoor transmitter 200 in accordance with Embodiment 1, except for the configuration in FPGA 245.

Figure 13:
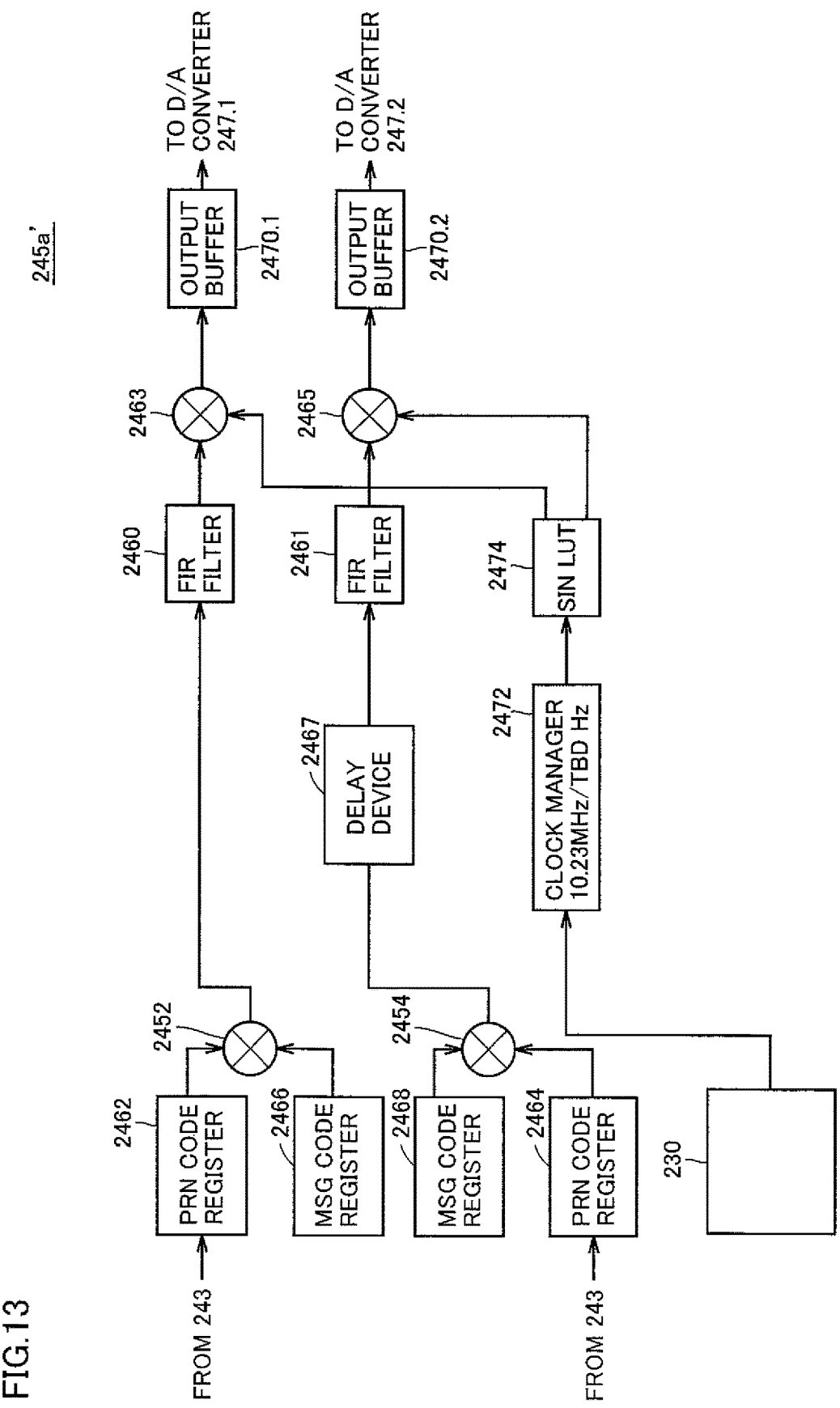
FIG. 13 is a block diagram showing hardware configuration of an indoor transmitter 200-1' in accordance with Embodiment 2.

FIG. 13 is a functional block diagram illustrating a first example of the configuration of a modulator 245a' for modulating a C/A code baseband signal of current GPS signal, in accordance with its signal format, among the circuits realized by FPGA 245.

The first difference from the configuration of modulator 245a in accordance with Embodiment 1 shown in FIG. 6 is that PRN code registers 2462 and 2464 receive and store the same PRN code stored in EEPROM 243. The second difference from the configuration of modulator 245a in accordance with Embodiment 1 shown in FIG. 6 is that a delay device 2467 for delaying the signal output to output buffer 2470.2 by the above-described amount of delay is provided.

Except for these points, the configuration is the same as that of modulator 245a in accordance with Embodiment 1 and, therefore, description thereof will not be repeated.

Figure 14:
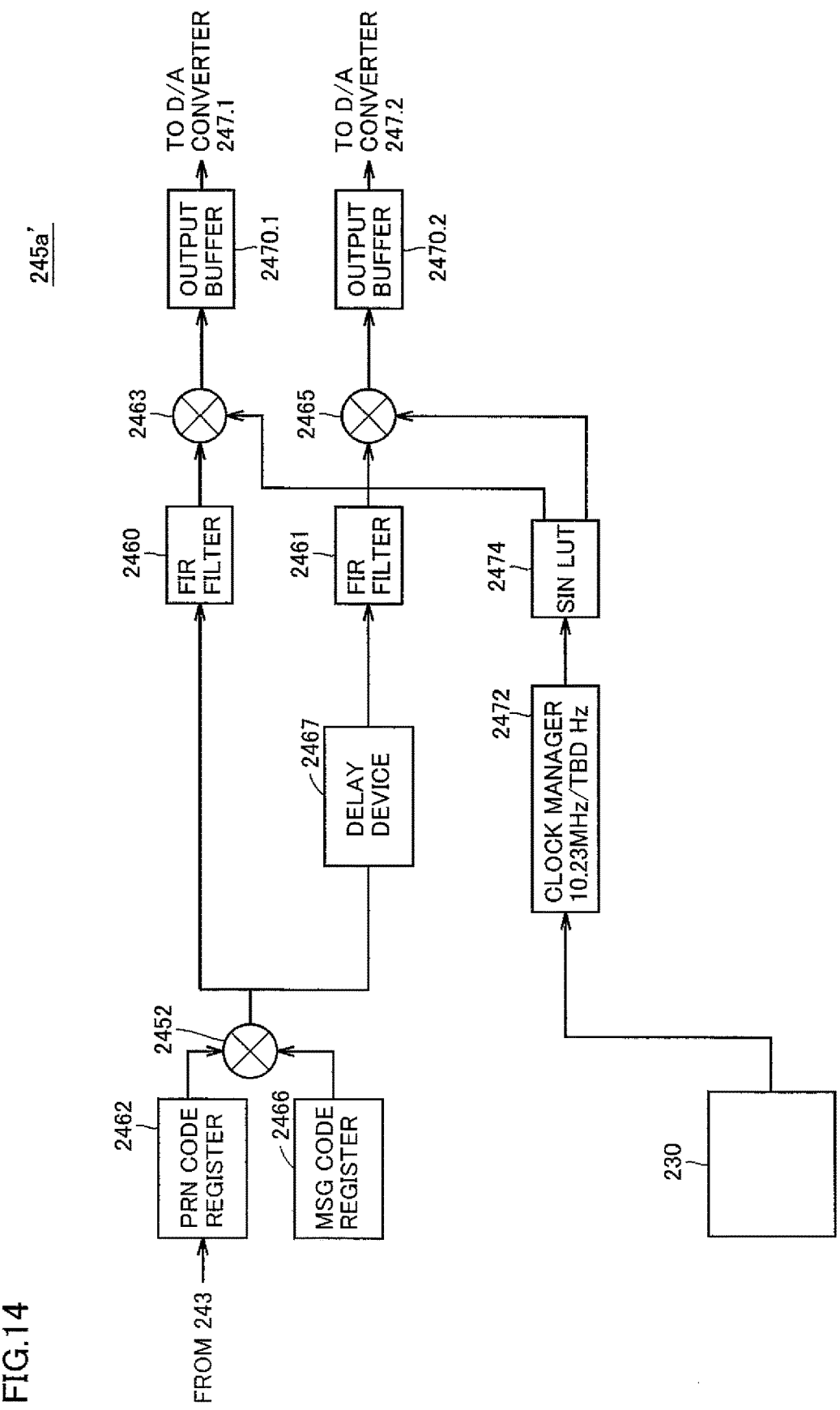
FIG. 14 is a functional block diagram illustrating a configuration of a modulator 245a'.

FIG. 14 is a functional block diagram illustrating a second example of the configuration of a modulator 245a' for modulating a C/A code baseband signal of current GPS signal, in accordance with its signal format, among the circuits realized by FPGA 245.

Referring to FIG. 14, the difference from the first example of configuration shown in FIG. 13 is that PRN code register 2464 and multiplier 2454 are omitted, and the output of multiplier 2452 is input to delay device 2467.

Except for this point, the configuration is the same as that of FIG. 13 and, therefore, description thereof will not be repeated.

The configuration of positional information providing apparatus 100' in accordance with Embodiment 2 is basically the same as that of positional information providing apparatus 100 in accordance with Embodiment 1 described with reference to FIG. 8, except that in tracking control, the replica signal generation timing is controlled differently in correlator units 410.1 to 410.n, as described with reference to FIG. 12.

<Process Flow of Indoor Positioning>

Figure 15:
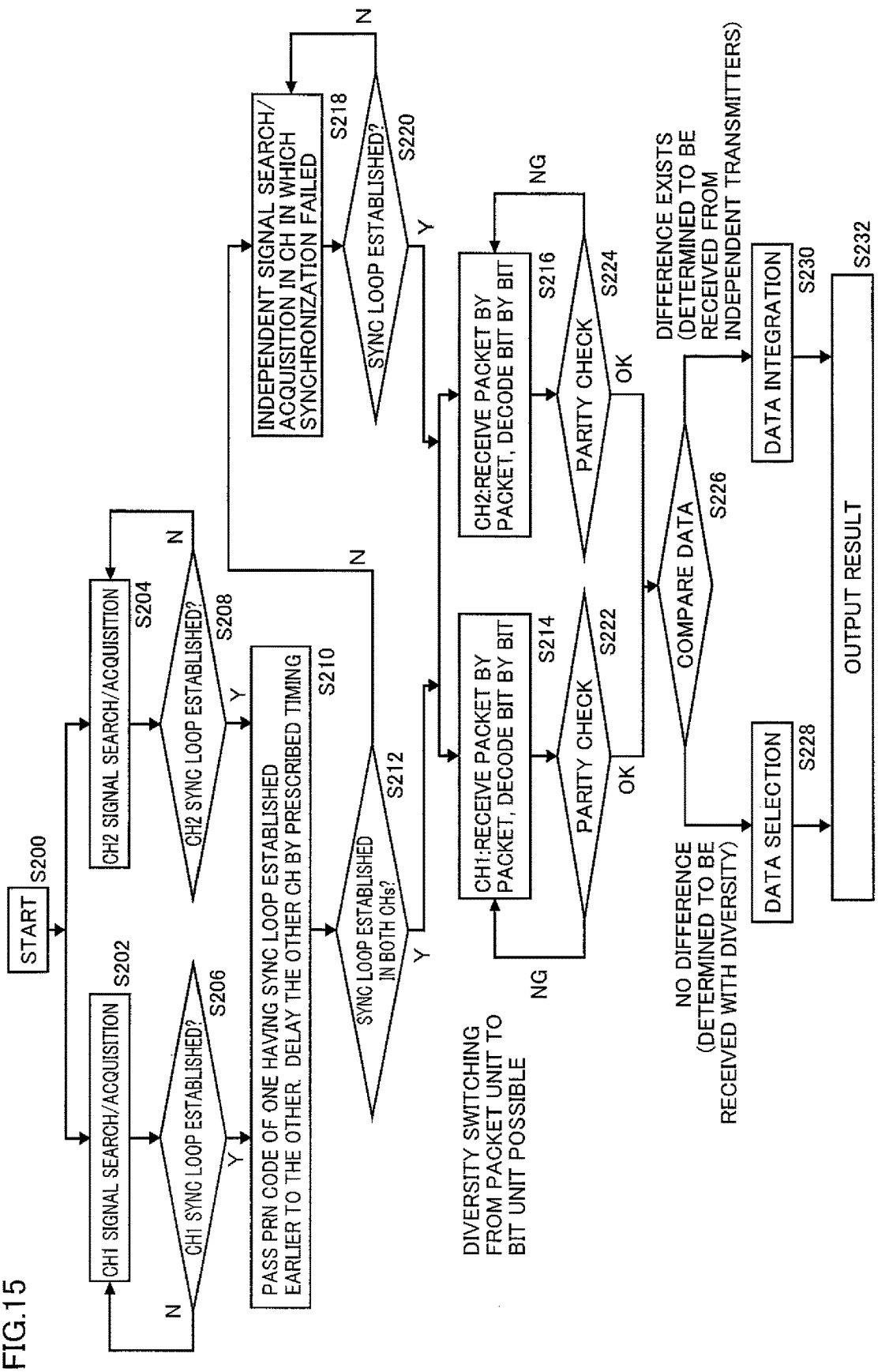
FIG. 15 is a chart representing a process executed by a control unit 414, a determining unit 416 and an indoor positioning unit 434.

FIG. 15 is a chart representing a process executed by control unit 414, determining unit 416 and indoor positioning unit 434, which corresponds to FIG. 9 of Embodiment 1.

Referring to FIG. 15, when the receiving process starts (step S200), under the control of control unit 414, correlator units 410.1 to 410.n perform the correlation process on possible spread codes (PRN codes), so that control unit 414 executes acquisition and synchronizing processes in parallel. By way of example, in the present embodiment, indoor transmitter 200 performs search and acquisition processes in parallel and asynchronously, on two channels CH1 and CH2, which correspond to the signals transmitted from transmission antennas TX-ANT1 and TX-ANT2 (steps S202, S204).

The search and acquisition process as such is continued under the control of control unit 414 until acquisition is completed and synchronization loop is established for any of the channels (steps S206, S208).

If the synchronization loop is established early for one of the channels CH1 and CH2 and if it is determined by determining unit 416 that the channel corresponds to the positioning signal from indoor transmitter 200, control unit 414 executes the search and acquisition process, with the delay time of the corresponding one of variable delay devices set to provide a delay of a prescribed timing, for the PRN code, which is the same as the synchronization-established PRN code (step S210). Specifically, using the information related to timing of reception of the spread code used for establishing synchronization loop in one channel and using the PRN code information, the tracking and acquisition process is executed assuming that the spread code of the other channel has further time delay corresponding to the prescribed timing, at the timing of reception.

If synchronization loop of one channel is established, the PRN code and information of the frequency of synchronization loop for locking the signal (frequency of local oscillator, such as a PLL oscillator, used for forming a replica signal with synchronized spread code) is passed to the other channel Thus, fast synchronization of the two channels becomes possible. Further, as the prescribed amount of delay is stored in positional information providing apparatus 100, if one channel is acquired, fast acquisition of the other channel is possible.

Thereafter, if it is determined that the successfully synchronized channel corresponds to a positioning signal from indoor transmitter 200, determining unit 416 determines whether the synchronization has been established in both channels within a prescribed time period (step S212).

The subsequent process steps S214 to S232 are the same as process steps S114 to S132 of Embodiment 1 and, therefore, description thereof will not be repeated.

By the process as described above, stable indoor signal reception becomes possible. Further, even indoors, positional information can be provided with the stable accuracy of about a few meters.

In addition, effects similar to those attained by Embodiment 1 are realized.

Embodiment 3

Figure 16:
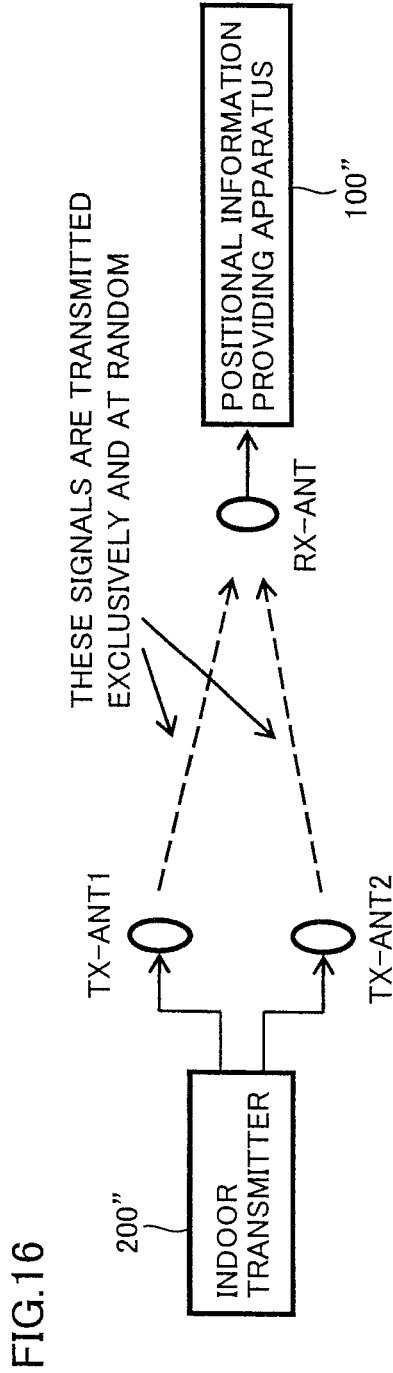
FIG. 16 is a schematic illustration showing a state of reception of positional information providing apparatus 100" receiving a positional signal from an indoor transmitter 200" in accordance with Embodiment 3.

FIG. 16 is a schematic illustration showing a state of reception of positional information providing apparatus 100" receiving a positional signal from an indoor transmitter 200" in accordance with Embodiment 3.

On indoor transmitter 200", transmission antennas TX-ANT1 and TX-ANT2 are arranged at physically distant positions. According to one or more embodiments of the present invention, distance between the two antennas is about dozens of centimeters to about 1 m. In this embodiment also, the number of transmission antennas is not limited to two, and generally, what is necessary is that a plurality of antennas are provided.

Indoor transmitter 200" in accordance with Embodiment 3 transmits, from two antennas, positioning signals identical in frequency, in coherency of carrier waves, PRN code and code timing. It is noted, however, that the signals from two antennas are transmitted exclusively and intermittently.

The receiving system may have the same hardware configuration as that of positional information providing apparatus 100 of Embodiment 1 shown in FIG. 8, to enjoy the characteristics of the system. It is noted, however, that control unit 414 and determining unit 416 execute the processes as will be described in the following.

Indoor transmitter 200" in accordance with Embodiment 3 may prevent unstable communication resulting from fading phenomenon caused by radio waves reflected by structures on indoor walls mainly by such a modification in the configuration of the transmitter side.

Figure 17:
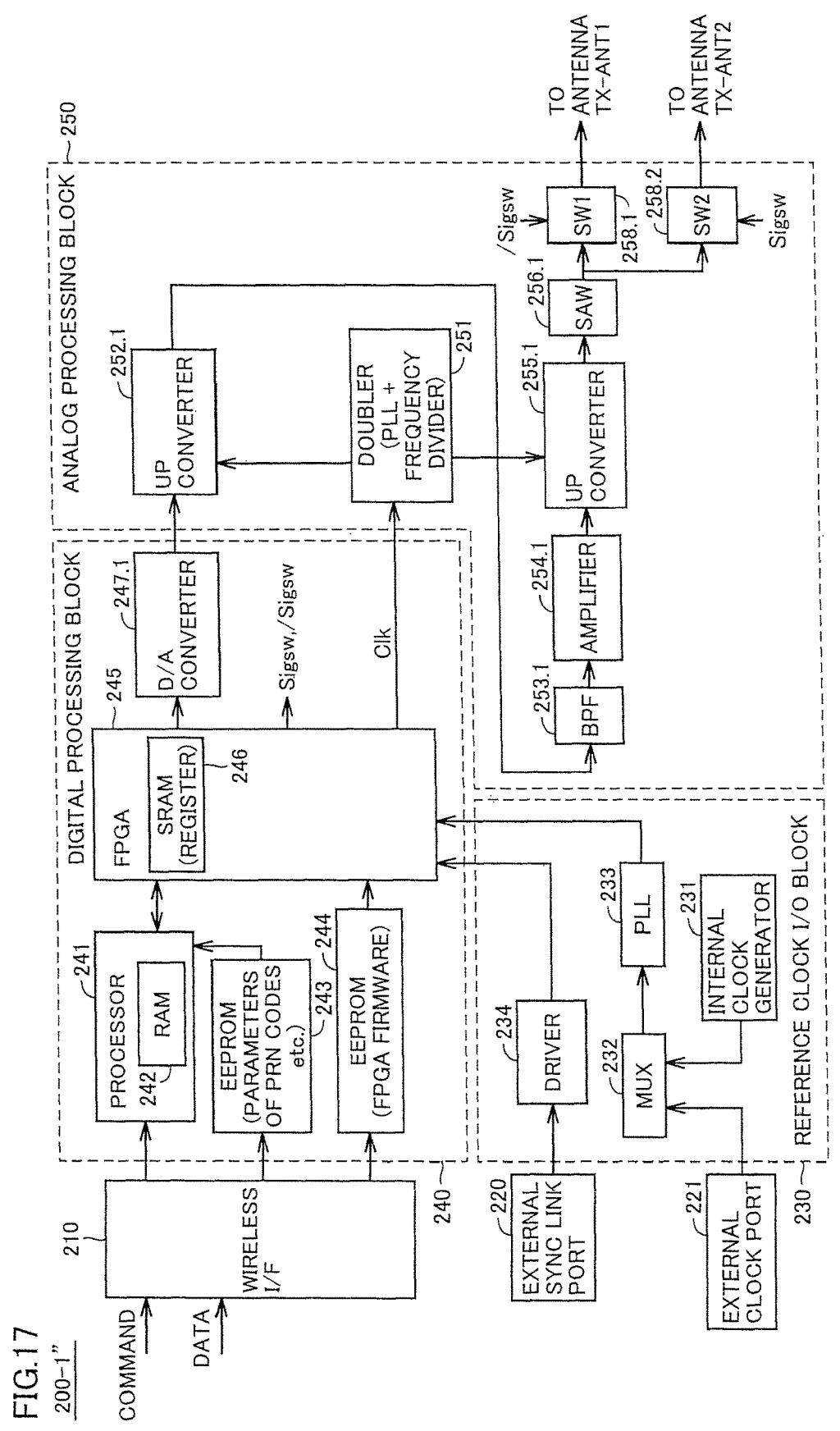

FIG. 17 is a block diagram showing hardware configuration of an indoor transmitter 200-1" in accordance with Embodiment 3.

The configuration of indoor transmitter 200-1" in accordance with Embodiment 3 differs from that of indoor transmitter 200' of Embodiment 2 in the following points.

First, indoor transmitter 200-1" in accordance with Embodiment 3 has such a configuration that a bit stream spread by one PRN code is output from FPGA 245 and, in addition, signals Sigsw and/Sigsw for controlling the above-mentioned "exclusive and intermittent" transmission are output. Here, the signals Sigsw and/Sigsw are mutually complementary signals.

Further, in indoor transmitter 200-1" in accordance with Embodiment 3, the signal output from SAW 256.1 is transmitted from transmission antennas TX-ANT1 and TX-ANT2 exclusively and intermittently, by switching circuits 258.1 and 258.2, which are controlled by the signals Sigsw and/Sigsw, respectively.

Except for these points, the configuration is the same as that of indoor transmitter 200' in accordance with Embodiment 2 and, therefore, description thereof will not be repeated.

Figure 18:
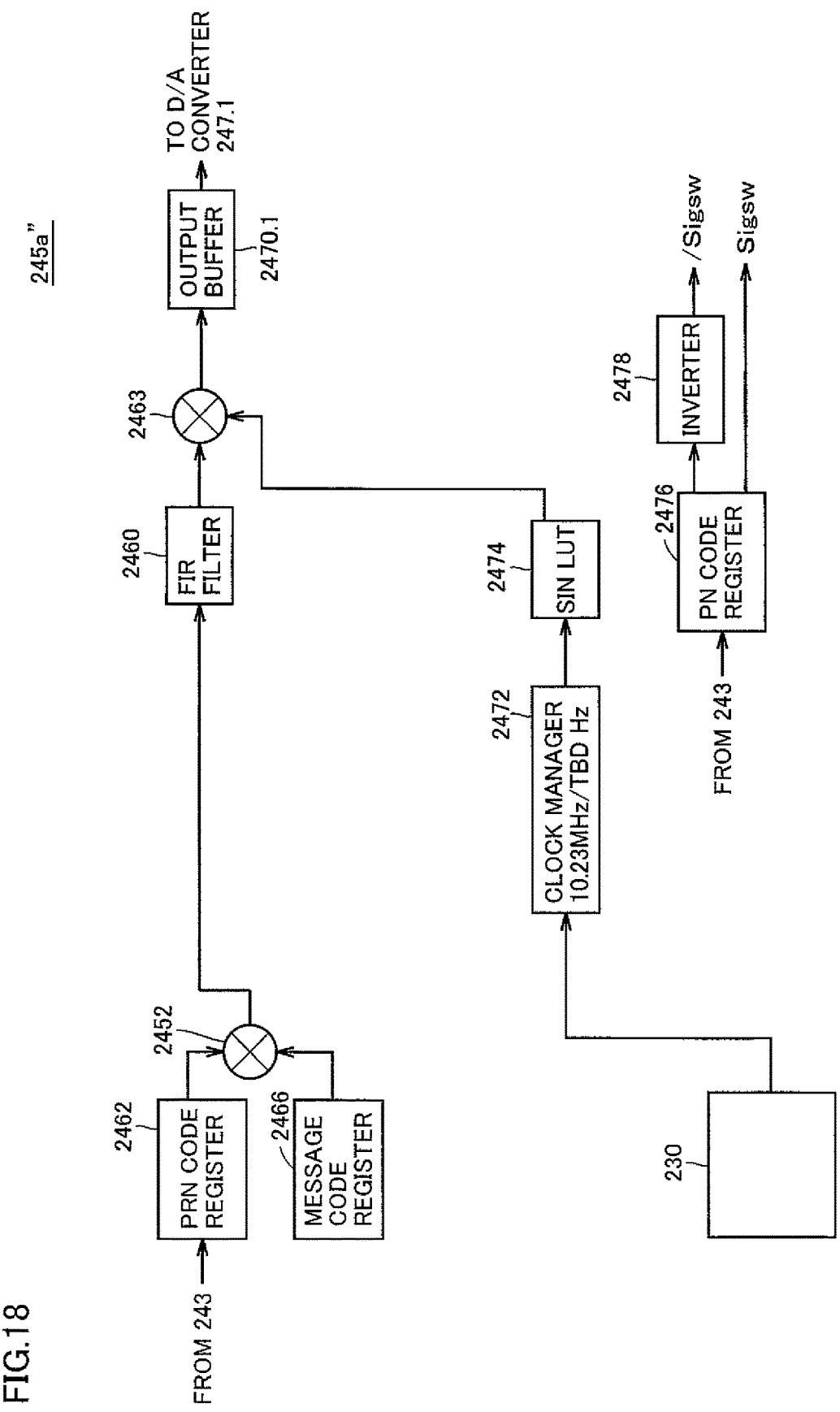
FIG. 18 is a functional block diagram illustrating a configuration of a modulator 245e.

FIG. 18 is a functional block diagram illustrating a configuration of a modulator 245e, for modulating a baseband signal of C/A code of current GPS signal in accordance with its signal format, among the circuits realized by FPGA 245 shown in FIG. 17.

The configuration of modulator 245e in accordance with Embodiment 3 is different from that of modulator 245a' in accordance with Embodiment 2 shown in FIG. 14 in that it includes a PN code register 2476 for reading and storing an initial value of a pseudo noise code (referred to as a PN code) different from that used for the spreading process from EEPROM 243 and successively outputting bit signals of the PN code time-sequentially as the signal Sigsw, and an inverter 2478 receiving, inverting and outputting the output of PN code register 2476.

The PN code is operable with the bit clock of 2-chip unit of the PRN code used for the spreading process, and outputs to the transmission antennas are switched accordingly. Because of such a configuration, the positioning signals are not simultaneously transmitted from transmission antennas TX-ANT1 and TX-ANT2, and at any time, either one of the antennas is transmitting a signal.

The signals/Sigsw and Sigsw controlling transmission from the antennas may be any alternating signals that are inverted with the same time-ratio. More desirably, however, the signals/Sigsw and Sigsw controlling transmission from the antennas are generated from the PN code as described above, which PN code is a random code and a mean integrated value of the code values is 0, if generated bits 1 and 0 are assumed to correspond to −1 and 1. It is noted, however, that the signals controlling switch circuits 258.1 and 258.2 should have weak correlation with the PRN code used for the spreading process. Because of such characteristics of the PN code, the frequency of positioning signal transmission from transmission antenna TX-ANT1 becomes equal to the frequency of positioning signal transmission from transmission antenna TX-ANT2.

Modulator 245a" also outputs a signal compatible with the current GPS signal (signal compatible with L1 C/A code: L1 C/A compatible signal) by a firmware of FPGA 245. Specifically, modulator 245e modulates the information of "latitude, longitude and altitude" of the transmitter as a message, and thereby generates a BPSK modulated signal.

Switch circuits 258.1 and 258.2 output the signal from SAW 256.1 to the corresponding transmission antenna TX-ANT1 or TX-ANT2 if the signals Sigsw and /Sigsw are at the "H" level, and stop outputting if the signals are at the "L" level. Thus, as those skilled in the art will readily appreciate, the H level is output on and the L level is output off.

Figure 19:
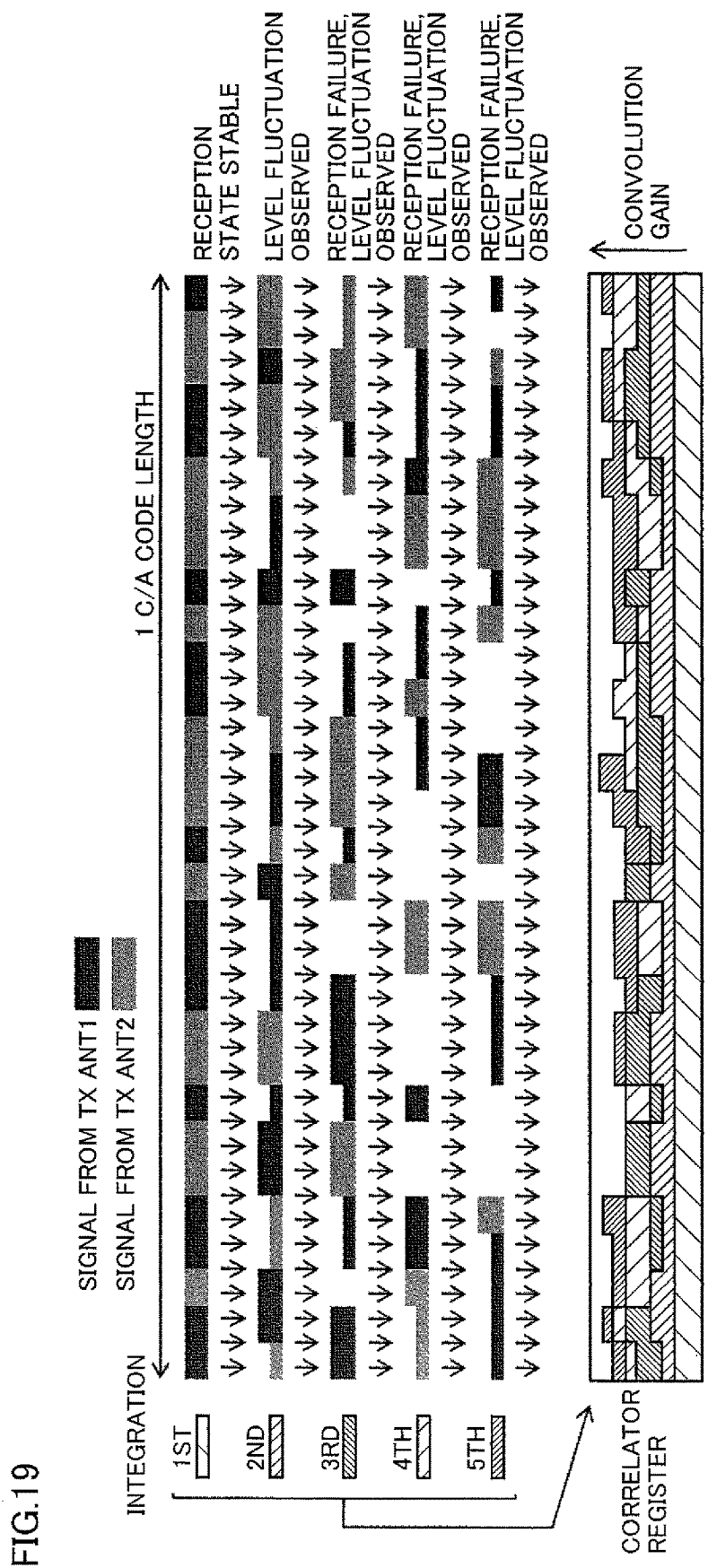
FIG. 19 shows time-change of signal levels integrated by integrators 412.1 to 412.n in positional information providing apparatus 100 in accordance with Embodiment 3.

FIG. 19 shows time-change of signal levels integrated by integrators 412.1 to 412.n in positional information providing apparatus 100 in accordance with Embodiment 3.

Because of the influence of multipath fading, positional information providing apparatus 100 receives signals from transmission antennas TX-ANT1 and TX-ANT2 in an unstable manner In the figure, a solid line represents a signal from transmission antenna TX-ANT1, and a thin line represents a signal from transmission antenna TX-ANT2. The line width represents the intensity of received signal. Blank portion (missing portion) represents that reception failed because of fading or the like.

In the example shown in FIG. 19, it is assumed that as positional information providing apparatus 100 moves, reception environment changes significantly and reception fails at some occasions of integration by integrators 412.1 to 412.n.

Figure 20:
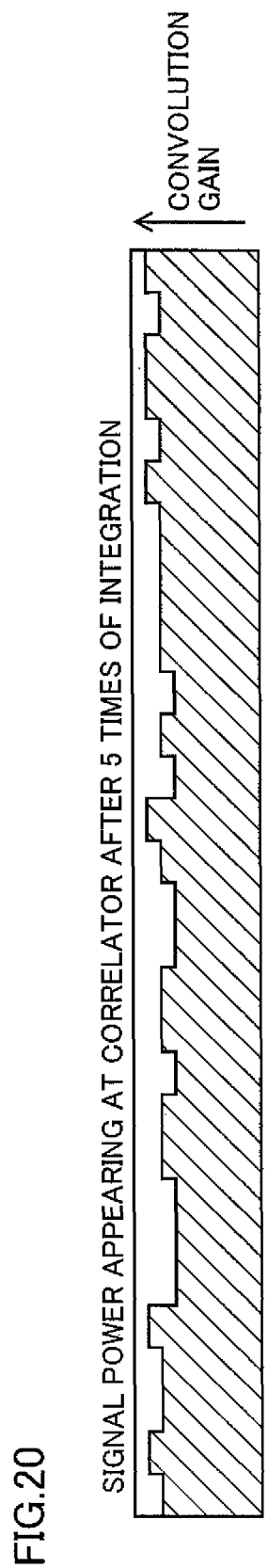
FIG. 20 shows an example of signal power obtained by five integrating operations of integrators 412.1 to 412.n in the example shown in FIG. 19.

FIG. 20 shows an example of signal power obtained by five integrating operations of integrators 412.1 to 412.n in the example shown in FIG. 19.

FIG. 21 is a table indicating periods of exclusively and intermittently switching transmission signal outputs, and corresponding advantages and disadvantages.

Since the signals transmitted from the two transmission antennas are identical, integration can be done without necessitating any distinction between the signals from transmission antennas TX-ANT1 and TX-ANT2.

In such a configuration, power bias does not occur with respect to the transmitted C/A code. As shown in FIG. 18, when generating the C/A code by message code register 2466 through multiplier 2452, correlation at the time of transmission from two antennas must be considered. Here, the signal from message code register 2466 is very slow as compared with the C/A code, and influence of correlation is very low.

On the other hand, the PN code simply controls the transmission power from the two antennas. Generally, the signal power received by positional information providing apparatus 100 is a result of combination (phase synthesis) of recurrence period of a plurality of reflection paths. If the apparatus moves, the number of paths and the power also change. Accordingly, the power appearing at the receiving end of positional information providing apparatus 100 would be very complicated, involving periodicity and randomness. In order to weaken correlation to such randomness and periodicity, switch circuits 258.1 and 258.2 are controlled by the pseudo noise code.

Here, the integration process by integrators 412.1 to 412.n is the process conventionally done in a general GPS receiver. Therefore, the system in accordance with Embodiment 3 is advantageous in that basically the receiving system does not require any change or modification.

Although embodiments of the present invention has been described and illustrated in detail, it is clearly understood that the same is by way of illustration and example only and is not to be taken by way of limitation, the scope of the present invention being interpreted by the terms of the appended claims.

REFERENCE SIGNS LIST 10 positional information providing system, 110, 111, 112 GPS satellites, 120, 121, 122 transmitters, 100, 100-1, 100-2, 100-3, 100-4 positional information providing apparatuses, 130 building, 200, 200-1, 200-2, 200-3, 1110 indoor transmitters, 210 wireless I/F, 220 external link synchronization port, 221 external clock port, 230 reference clock I/O block, 240 digital processing block, 241 processor, 242 RAM, 243, 244 EEPROM, 245 FPGA, 250 analog processing block, TX-ANT1, TX-ANT2 transmission antennas, RX-ANT reception antenna.

The invention claimed is:

1. A navigation signal transmitting apparatus, provided on ground, for transmitting a navigation signal to a receiver capable of positioning by receiving a spread spectrum satellite positioning signal from a satellite, comprising:
first and second transmission antennas;
a memory that stores location data for specifying a location where the navigation signal transmitting apparatus is installed;
a processor that generates a message signal of positional information including the location data;
a modulator that modulates said message signal by a modulation process including spectrum spreading, using a spread code stored in advance in said navigation signal transmitting apparatus, a sequence of the spread code corresponding to a sequence of the spread codes allotted in advance to said receiver, and generates a first navigation signal based on said message signal;
an analog processor that transmits said first navigation signal from said first and second transmission antennas, the transmitter including:
a first switching circuit arranged between the modulator and the first transmission antenna; and
a second switching circuit arranged between the modulator and the second transmission antenna, and
a programmable logic circuit for outputting a first signal for controlling the first switching circuit and a second signal for controlling the second switching circuit, wherein the first signal is at an H level when the second signal is at an L level, and vice versa, the programmable logic circuit being electrically connected to the memory, the processor, and the analog processor, and the programmable logic circuit comprising the modulator,
wherein said modulator includes:
a spread code generator that generates a specific code of said spread codes of the same sequence; and
a first multiplier that performs spectrum spreading on said message signal with said specific code,
wherein the first switching circuit gates on the navigation signal to the first transmission antenna when the level of the first signal is at the H level; and
wherein the second switching circuit gates on the navigation signal to the second transmission antenna when the level of the second signal is at the H level.

2. The navigation signal transmitting apparatus according to claim 1, wherein said modulator includes:
the spread code generator that generates a specific code of said spread codes of the same sequence;
the first multiplier that performs spectrum spreading on said message signal with said specific code, to generate said first navigation signal.

3. The navigation signal transmitting apparatus according to claim 1, wherein said modulator includes:
the spread code generator that generates said specific code of said spread codes of the same sequence;
the first multiplier that performs spectrum spreading on said message signal with said specific code, to generate said first navigation signal; and
a second multiplier,
wherein the modulator delays said message signal by a prescribed time period, and
wherein the second multiplier performs spectrum spreading on said delayed message signal with said specific code, to generate a second navigational signal.

4. The navigation signal transmitting apparatus according to claim 1, wherein said positional information includes data representing at least latitude, longitude and altitude.

5. A method of transmitting a navigation signal of a transmitter provided on ground, for transmitting a navigation signal to a receiver capable of positioning by receiving a spread spectrum satellite positioning signal from a satellite, comprising:
storing, with a memory of the transmitter, location data for specifying a location where the transmitter is installed;
generating, with a processor of the transmitter, a message signal of positional information including the location data;
modulating, with a modulator of the transmitter, said message signal by a modulation process including spectrum spreading using a spread code stored in advance in the transmitter, a sequence of the spread code corresponding to a sequence of the spread code allotted in advance to said receiver, and generating a navigation signal based on said message signal;
transmitting said navigation signal from first and second transmission antennas, the transmitter comprising:
a first switching circuit arranged between the modulator and the first transmission antenna; and
a second switching circuit arranged between the modulator and the second transmission antenna;
controlling the first switching circuit with a first signal that is output from a programmable logic circuit; and
controlling the second switching circuit with a second signal that is output from the programmable logic circuit,
wherein the first signal is at an H level when the second signal is at an L level, and vice versa,
wherein modulating comprises:
generating, using a spread code generator of the modulator, a specific code of the spread codes of the same sequence; and
performing spectrum spreading, using a multiplier of the modulator, on the message signal with the specific code,
wherein transmitting comprises:
gating on the navigation signal from the first switching circuit when the first signal is at the H level; and
gating on the navigation signal from the second switching circuit when the second signal is at the H level.

6. The method of transmitting a navigation signal according to claim 5, wherein said generating said first and second navigation signals includes:

generating, with the spread code generator of the modulator, said specific code of said spread codes of the same sequence;

performing, with the multiplier of the modulator, spectrum spreading on said message signal with said specific code, to generate said first navigation signal;

delaying, with a delay device, said message signal by a prescribed time period; and performing spectrum spreading on said delayed message signal with said specific code, to generate a second navigation signal.

7. The method of transmitting a navigation signal according to claim 5, wherein said generating said first and second navigation signals includes:

generating, with the spread code generator of the modulator, said specific code of said spread codes of the same sequence;

generating, with a sequence generator of the transmitter, a sequence of pseudo random numbers;

performing, with the multiplier, spectrum spreading on said message signal with said specific code, to generate said first navigation signal; and performing, with the multiplier, spectrum spreading on said message signal with said specific code, to generate a second navigation signal; wherein said transmitting includes transmitting said first and second navigation signals successively and exclusively from either one of said first and second transmission antennas, based on said pseudo random numbers.

8. The method of transmitting a navigation signal according to claim 5, wherein said positional information includes data representing at least latitude, longitude and altitude.

* * * * *